(12) United States Patent
Kwak et al.

(10) Patent No.: US 10,019,013 B2
(45) Date of Patent: Jul. 10, 2018

(54) ROBOT CLEANER AND CONTROLLING METHOD THEREOF

(71) Applicant: SAMSUNG ELECTRONICS CO., LTD., Suwon-si, Gyeonggi-do (KR)

(72) Inventors: No San Kwak, Suwon-si (KR); Kyung Shik Roh, Seongnam-si (KR); Soon Yong Park, Bucheon-si (KR); Suk June Yoon, Seoul (KR); So Hee Lee, Seoul (KR); Min Yong Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 70 days.

(21) Appl. No.: 15/204,219

(22) Filed: Jul. 7, 2016

(65) Prior Publication Data

US 2017/0102709 A1 Apr. 13, 2017

(30) Foreign Application Priority Data

Oct. 12, 2015 (KR) .................. 10-2015-0142297

(51) Int. Cl.
*G05D 1/02* (2006.01)
*A47L 11/40* (2006.01)

(52) U.S. Cl.
CPC ........ *G05D 1/0242* (2013.01); *A47L 11/4011* (2013.01); *G05D 1/0225* (2013.01); *A47L 2201/022* (2013.01); *A47L 2201/04* (2013.01); *G05D 2201/0215* (2013.01)

(58) Field of Classification Search
CPC .. G05D 1/0242; G05D 1/0225; A47L 11/4011
USPC .......................................................... 701/28
See application file for complete search history.

(56) References Cited

U.S. PATENT DOCUMENTS

| 8,380,350 B2 * | 2/2013 | Ozick ................ A47L 5/30 |
| | | 700/250 |
| 2009/0177320 A1 * | 7/2009 | Lee ..................... B25J 5/00 |
| | | 700/245 |
| 2012/0020533 A1 * | 1/2012 | Liu .................. G06K 9/00476 |
| | | 382/113 |
| 2014/0295878 A1 * | 10/2014 | Yang ................ G01S 5/0252 |
| | | 455/456.1 |
| 2017/0135541 A1 * | 5/2017 | Kwak ............... A47L 9/2894 |
| 2017/0273527 A1 * | 9/2017 | Han .................. A47L 9/2805 |

FOREIGN PATENT DOCUMENTS

| KR | 10-2010-0069965 | 6/2010 |
| KR | 10-2013-0031088 | 3/2013 |

* cited by examiner

*Primary Examiner* — Yazan Soofi
(74) *Attorney, Agent, or Firm* — Staas & Halsey LLP

(57) ABSTRACT

Embodiments of the present disclosure relate to a robot cleaner and a control method of the robot cleaner, more particularly, to a robot cleaner configured to correct position information of the robot cleaner by acquiring a position of a docking station during the robot clear drives and to correct a map by using corrected position information, and a control method of the robot cleaner.

14 Claims, 17 Drawing Sheets

ROBOT CLEANER AND CONTROLLING METHOD THEREOF

CROSS-REFERENCE TO RELATED APPLICATION

This application claims the benefit of Korean Patent Application No. 10-2015-0142297 filed on Oct. 12, 2015 in the Korean Intellectual Property Office, the disclosure of which is incorporated herein by reference.

BACKGROUND

1. Field

Embodiments of the present disclosure relate to a robot cleaner and a control method of the robot cleaner, more particularly, to a robot cleaner configured to correct position information of the robot cleaner by acquiring a position of a docking station during the robot clear drives and to correct a map by using corrected position information, and a control method of the robot cleaner.

2. Description of the Related Art

A robot cleaner is an appliance that automatically cleans a room by sucking up foreign materials, such as dust, from a floor of room while driving in the room without user intervention. That is, the robot cleaner cleans a room while driving in the room.

At this time, the robot cleaner generates a map by acquiring its position to clean the room while driving in the room. The robot cleaner typically generates a map by using Simultaneous Localization And Mapping (SLAM) method. The SLAM is a method configured to generate a map while estimating a location of a robot, at the same time. Since the robot does not acquire a cleaning region, the robot may be needed to calculate its position to generate a map. However, when the robot performs operations such as acquiring its position, generating a map, and updating the map, in a real time at the same time, there may be an error that is a difference between the generated map and a real map.

Therefore, a robot cleaner is needed to precisely acquire its position and generate an accurate map so that the robot cleaner acquires an accurate cleaning region and performs a cleaning in various cleaning conditions.

SUMMARY

It is an aspect of the present disclosure to provide a robot cleaner configured to correct position information that is stored during driving, based on actual position information, and configured to correct a map that is generated based on the corrected position information, and a control method of the robot cleaner.

Additional aspects of the present disclosure will be set forth in part in the description which follows and, in part, will be obvious from the description, or may be learned by practice of the present disclosure.

In accordance with an aspect of the present disclosure, a robot cleaner includes a body; a driving unit configured to move the body; a signal detector configured to detect an output signal of a docking station; a position detector configured to acquire first position information of the body during the body drives; a storage configured to store the first position information of the body acquired by the position detector; and a controller, when detecting an output signal of the docking station during the body drives, configured to estimate second position information of the body based on the output signal of the docking station and position information of the docking station and configured to correct the first position information of the body based on the second position information.

The controller may correct the first position information of the body so that a difference between the first position information of the body and the second position information of the body is minimized.

The controller may generate a map based on the stored first position information during the body drives.

When the stored first position information is corrected, the controller may update the map based on the corrected first position information.

The controller may acquires a position of the docking station by estimating a point in which directions of the output signal, which is detected in a plurality of different positions during the body drives, are intersected.

The controller may acquires a position of the docking station by estimating a direction of the output signal by filtering the output signal, which is detected in a plurality of different positions during the body drives, according to the probability based filtering method using Bayse filter.

Bayse filter may comprise at least one of Kalman Filter, Extended Kalman filter (EKF), Unscented Kalman filter (UKF), Information filter, Histogram Filter and Particle Filter.

The controller may acquire a position of the docking station by measuring a direction of the output signal detected by the signal detector of the body, and by measuring a distance between the body and the docking station based on a type and an intensity of the output signal.

The signal detector may comprise a signal receiver disposed at a plurality of positions of the body.

The signal detector may detect at least one of a proximity signal, a mid-distance signal, a front signal, and an omni-directional signal, which are differently output according to each position of a sensor installed in the docking station.

The signal detector differently may detect an intensity of the output signal of the docking station according to a distance between the docking station and the body.

The output signal of the docking station is an infrared signal.

In accordance with an aspect of the present disclosure, a control method of a robot cleaner provided with a body and a driving unit to move the body may include detecting an output signal of a docking station; acquiring first position information of the body during the body drives; storing the first position information of the body detected by a position detector; and when detecting an output signal of the docking station during the body drives, estimating second position information of the body based on the output signal of the docking station and position information of the docking station and correcting the first position information of the body based on the second position information.

The correcting a current position of the body may correct the first position information of the body so that a difference between the first position information of the body and the second position information of the body is minimized.

The generating a map is performed based on the stored first position information during the body drives.

When the stored first position information is corrected, generating a map may update the map based on the corrected first position information.

The acquiring a position of the docking station is performed by estimating a point, in which directions of the output signal, which is detected in a plurality of different positions during the body drives, are intersected.

The acquiring a position of the docking station is performed by estimating a direction of the output signal by filtering the output signal, which is detected in a plurality of different positions during the body drives, according to the probability based filtering method using Bayse filter.

The acquiring a position of the docking station is performed by estimating a direction of the output signal by filtering the output signal according to the probability based filtering method including at least one of Kalman Filter, Extended Kalman filter (EKF), Unscented Kalman filter (UKF), Information filter, Histogram Filter and Particle Filter.

The acquiring a position of the docking station is performed by measuring a direction of the output signal detected by the signal detector of the body, and by measuring a distance between the body and the docking station based on a type and an intensity of the output signal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
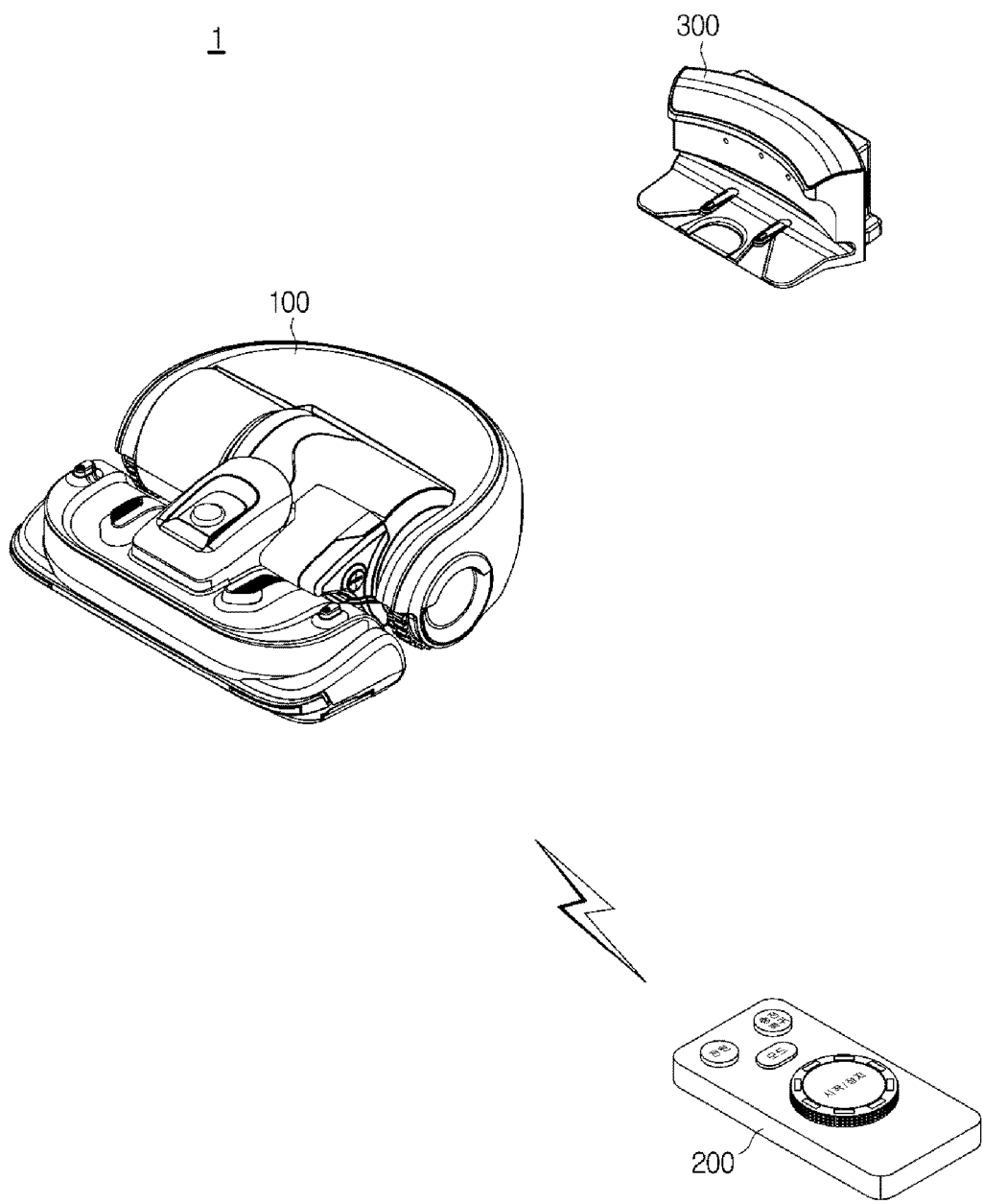
FIG. 1 is a view illustrating an exterior of a robot cleaner and a docking station in accordance with an embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Parts which are not associated with the description are omitted in order to specifically describe the present disclosure, and like reference numerals refer to like elements throughout the specification The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In addition, "touch" may be generated by any one of the fingers including a thumb, and a touchable input unit (e.g. stylus). "Touch" may include a hovering by any one of the fingers including a thumb, and a touchable input unit. In addition, "touch" may include a multi touch as well as a single touch. "body" may represent a body of a robot cleaner.

Reference will now be made in detail to embodiments of the present disclosure, examples of which are illustrated in the accompanying drawings.

Figure 2:
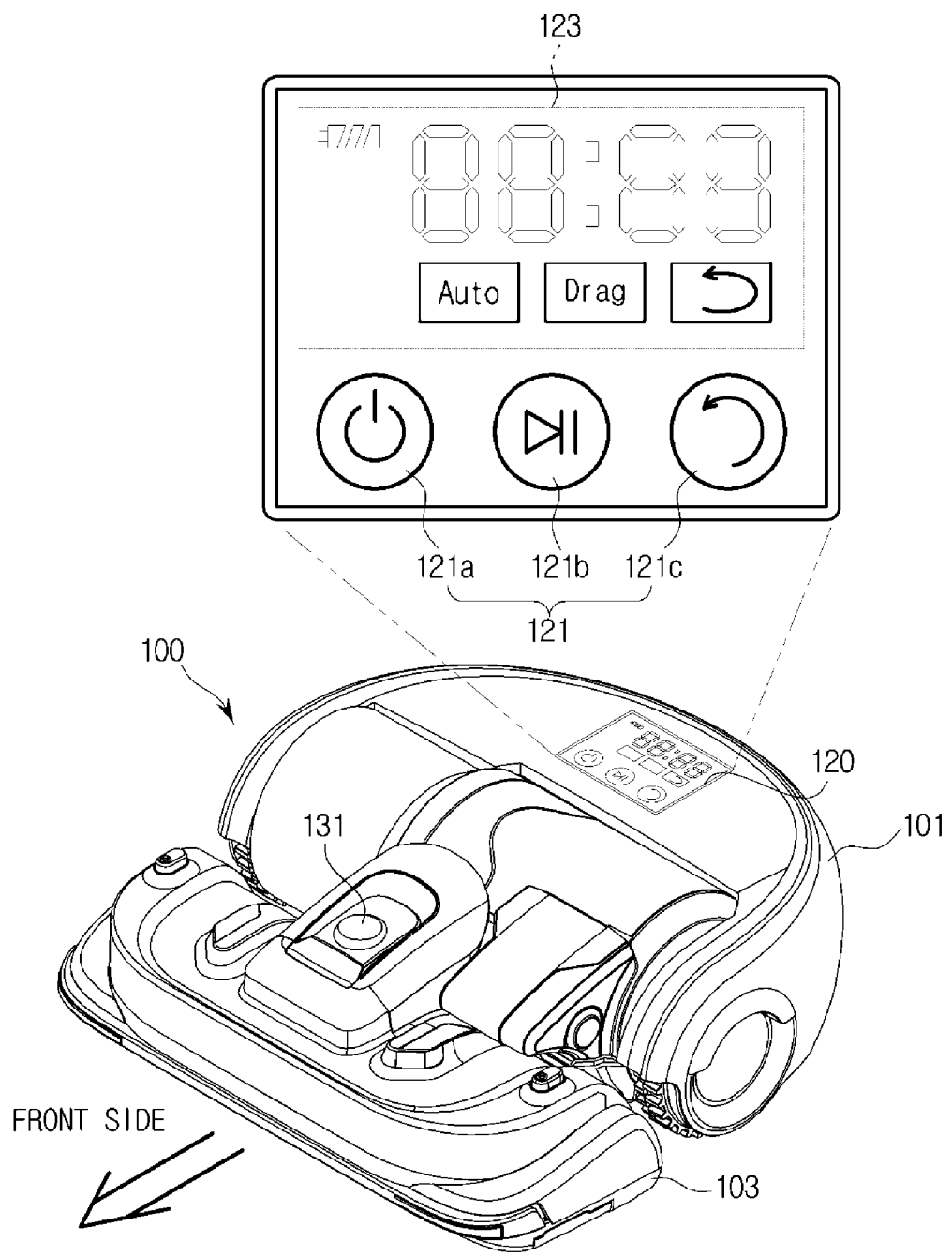
FIG. 2 is a view illustrating an exterior of a robot cleaner.

FIG. 1 is a view illustrating an exterior of a robot cleaner and a docking station in accordance with an embodiment of the present disclosure and FIG. 2 is a view illustrating an exterior of a robot cleaner.

An exterior and an operation of a robot cleaner 100 and a docking station 300 according to an embodiment will be described with reference to FIGS. 1 and 2. In addition, a control configuration and an interior of the robot cleaner 100 will be described with reference to FIGS. 3 to 6.

Referring to FIGS. 1 to 6, a robot cleaner system 1 according to an embodiment may include the robot cleaner 100 configured to perform an operation while automatically driving a certain region; a device 200 separated from the robot cleaner 100 and configured to remotely control the robot cleaner 100; and a docking station 300 separated from the robot cleaner 100 and configured to charge a power of a battery of the robot cleaner 100.

The robot cleaner 100 may be an apparatus configured to perform an operation in response to a control command after receiving the control command, and may be provided with a rechargeable battery and an obstacle sensor configured to allow the robot cleaner 100 to avoid an obstacle during driving so that the robot cleaner 100 automatically performs an operation while driving in a work region.

In addition, the robot cleaner 100 may use SLAM method configured to identify its position without advance information related to surrounding environments via a camera or a variety of sensors, and configured to generate a map based on the information related to surrounding environments. "SLAM" is an acronym for Simultaneous Localization And Mapping and represents a method to estimate a position of a robot and generate a map, at the same time.

The robot cleaner 100 may include a main body 101 and a sub-body 103. The main body 101 may have an approximately semi-circular-cylindrical shape, and the sub-body 103 may have a cuboidal shape.

A component configured to implement a function of the robot cleaner 100 may be provided in an inside and an outside of the main body 101 and the sub body 103.

Particularly, the robot cleaner 100 may include a user interface 120 interacting with a user; an image acquisition unit 130 acquiring an image of surroundings of the robot cleaner 100; an obstacle detector 140 detecting an obstacle; a position detector 150 detecting a position of the robot cleaner 100 based on a movement of the robot cleaner 100 while the robot cleaner 100 drives a zone to be cleaned (hereinafter referred to "a cleaning zone"); a driving unit 160 moving the robot cleaner 100; a cleaning unit 170 cleaning a cleaning zone; a storage 180 storing programs and a variety of data; a signal detector 190 receiving an infrared light emitted from the docking station 300; and a controller 110 generating a map to identify a cleaning zone of the robot cleaner 100 and controlling an operation of the robot cleaner 100.

As illustrated in FIG. 2, the user interface 120 may be provided on an upper surface of the main body 101 of the robot cleaner 100, and may include an input button 121 receiving a control command from a user and a display 123 displaying operation information of the robot cleaner 100.

The input button 121 may include a power button 121a turning on or turning off the robot cleaner 100; a play/stop button 121b operating or stopping the robot cleaner 100; and a return button 121c allowing the robot cleaner 100 to return to the docking station 300.

In addition, a button included in the input button 121 may employ a push switch detecting a user's pressure; a membrane switch or a touch switch detecting a touch of a user's body part.

The display 123 may display information of the robot cleaner 100 in response to a control command that is input by a user. For example, the display 123 may display an operation status, a power status, a cleaning mode selected by a user, and whether to return to the docking station of the robot cleaner 100.

The display 123 may employ a Light Emitting Diode (LED) emitting a light by itself, an Organic Light Emitting Diode (OLED) and a Liquid Crystal Display (LCD) provided with a separate light source.

Although not shown in the drawings, according to embodiments, the user interface 120 may include a Touch Screen Panel (TSP) receiving a control command from a user and displaying operation information in response to the received control command.

The touch screen panel may include a display displaying operation information and a control command that is input from a user; a touch panel detecting coordinates with which a user's body part makes contact; and a touch screen controller determining a control command input from a user based on the contact coordinates detected by the touch panel.

The image acquisition unit 130 may include a camera module 131 acquiring an image of surroundings of the robot cleaner 100.

The camera module 131 may be provided in an upper surface of the sub body 103 included in the robot cleaner 100, and may include a lens focusing a light emitted from an upper side of the robot cleaner 100; and an image sensor converting the light into an electrical signal.

The image sensor may employ Complementary Metal Oxide Semiconductor (CMOS) sensor and Charge coupled device (CCD) sensor.

The camera module 131 may convert an image of surroundings of the robot cleaner 100 into an electrical signal that is processable by the controller 110, and transmit an electrical image corresponding to an image of an upper side to the controller 110. An image provided from the image acquisition unit 130 may be used for the controller 110 to detect a position of the robot cleaner 100.

The obstacle detector 140 may detect an obstacle interrupting a movement of the robot cleaner 100.

"Obstacle" may represent all kind of things that protrude from a floor of a zone to be cleaned (hereinafter referred to as "a cleaning floor") to interrupt a movement of the robot cleaner 100 and may include a wall dividing the cleaning zone as well as furniture, e.g. a table and a couch.

The obstacle detector 140 may include a light transmission module 141 emitting a light to a front side of the robot cleaner 100; a light reception module 143 receiving a light reflected by an obstacle; and an optical sensor module 145 transmitting a light to a lateral side of the robot cleaner 100 and receiving a light reflected by an obstacle.

According to an embodiment, the robot cleaner 100 may use a light e.g. an infrared light to detect an obstacle, but is not limited thereto. The robot cleaner 100 may use an ultrasonic wave and a radio wave.

Figure 3:
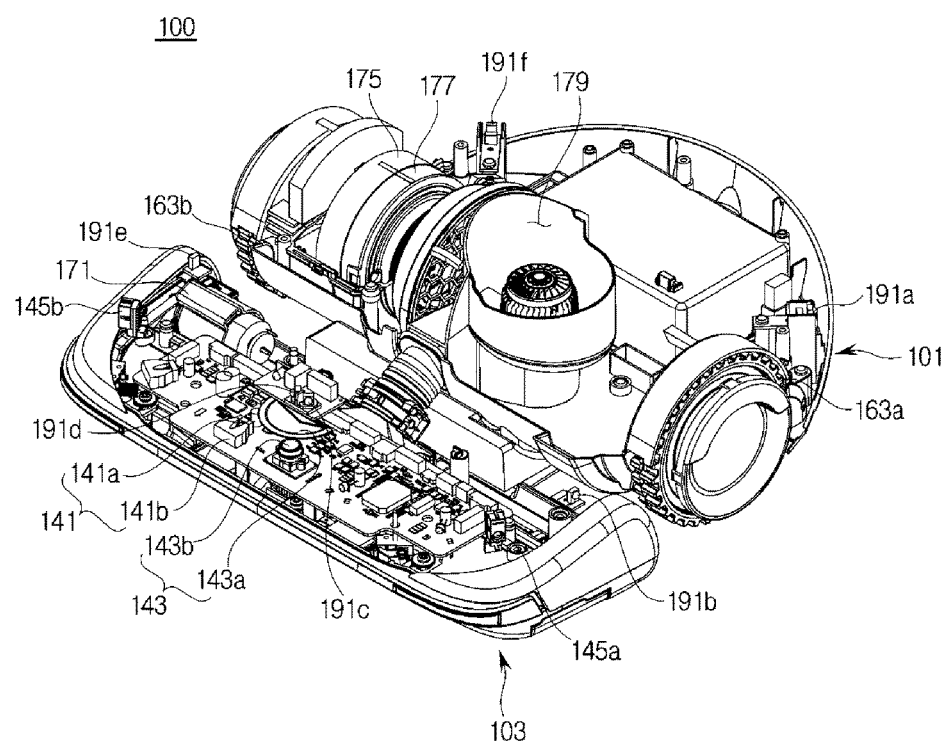
FIG. 3 is a view illustrating an interior of a robot cleaner.
Figure 4:
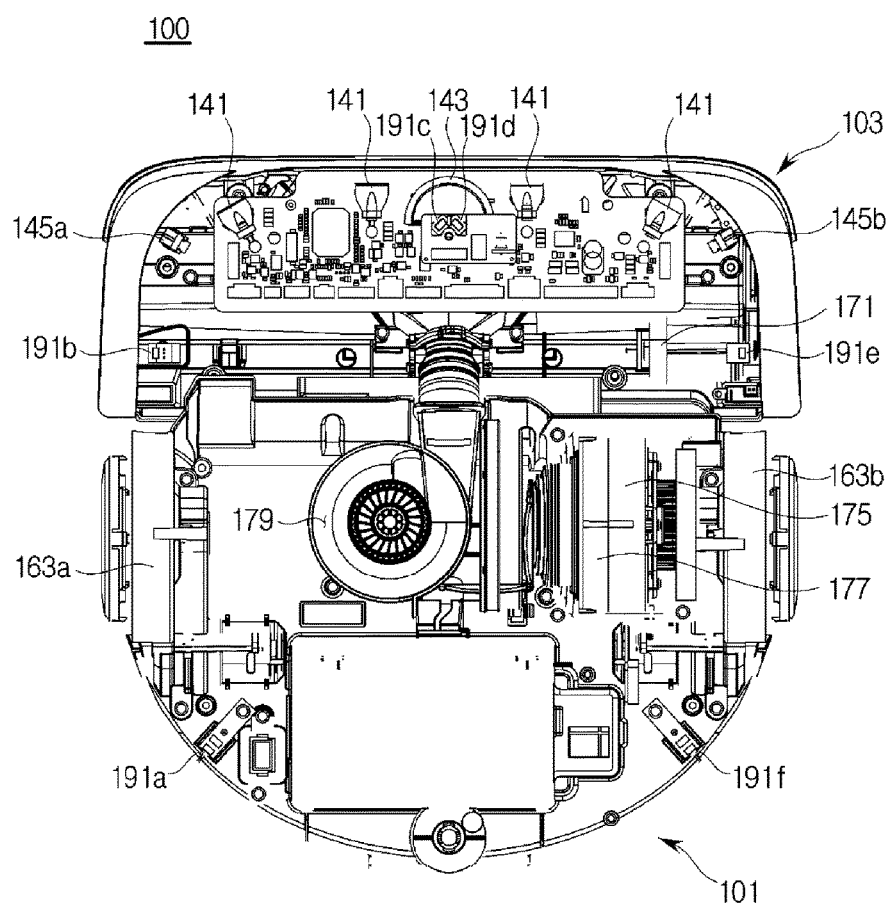
FIG. 4 is a view illustrating an interior of a robot cleaner.

As illustrated in FIGS. 3 and 4, the light transmission module 141 may include a light source 141a emitting a light and a wide-angle lens 141b diffusing the emitted light in a direction parallel to a cleaning floor.

The light source 141a may employ Light Emitting Diode (LED) or Light Amplification by Simulated Emission of Radiation (LASER) diode, both of which emit a light in various directions.

The wide-angle lens 141b may be formed of material transmitting a light, and configured to diffuse the emitted light in a direction parallel to a cleaning floor by using the refraction or the total reflection. Due to the wide-angle lens 141b, a light emitted from the light transmission module 141 may be diffused in a fan shape toward a front side of the robot cleaner 100. Hereinafter a light diffused in a direction parallel to a cleaning floor to have a fan shape will be referred to as "a flat light".

As illustrated in FIGS. 3 and 4, the obstacle detector 140 may include a plurality of the light transmission module 141 so that a region to which a flat light emitted from the light transmission module 141 is not reached is minimized.

The light reception module 143 may include a reflection mirror 143a focusing a light reflected by an obstacle and an image sensor 143b receiving a light reflected by the reflection mirror 143a.

As illustrated in FIGS. 3 and 4, the reflection mirror 143a may be provided above the image sensor 143b, and may have a conical shape whose point is toward the image sensor 143b. As mentioned above, the reflection mirror 143a may reflect a light reflected by an obstacle toward the image sensor 143b.

The image sensor 143b may be provided under the reflection mirror 143a, and may receive a light reflected by the reflection mirror 143a. Particularly, the image sensor 143b may acquire a two dimensional image formed on the reflection mirror 143a by the reflection light reflected by an obstacle. The light reception module 143 may be configured with a two dimensional image sensor in which an optical sensor is arranged in two dimensions.

It may be appropriate that the image sensor 143b employs the image sensor 143b receiving a light having the same wave length as that of a light emitted from the light source 141a of the light transmission module 141. For example, when the light source 141a emits a light in an infrared range, the image sensor 143b may employ an image sensor 143b configured to acquire an image in an infrared range.

The image sensor 143b may employ Complementary Metal Oxide Semiconductor (CMOS) sensor and Charge coupled device (CCD) sensor.

The light reception module 143 may be provided in the number that is different from the number of the light transmission module 141. As mentioned above, since the light transmission module 141 diffuses a light emitted from the light source 141a in various directions by using the wide-angle lens 141b, and the light reception module 143 focuses a light in various directions to the image sensor 143b by using the reflection mirror 143a, the obstacle detector 140 may include different number of the light transmission module 141 and the light reception module 143.

The optical sensor module 145 may include a left optical sensor module 145a emitting a light to be tilted toward the left side of the robot cleaner 100 and receiving a light reflected by an obstacle; and a right optical sensor module 145b emitting a light to be tilted toward the right side of the robot cleaner 100 and receiving a light reflected by an obstacle.

The optical sensor module 145 may be used for a drive of the robot cleaner 100 as well as detecting an obstacle. For example, when the robot cleaner 100 performs an obstacle border following travel that is driving while having a certain distance from an obstacle, the optical sensor module 145 may detect a distance between a lateral side of the robot cleaner 100 and an obstacle, and the controller 110 may control the driving unit 160 so that the robot cleaner 100 maintains a certain distance from an obstacle based on a result of a detection of the optical sensor module 145.

The optical sensor module 145 may be configured to assistant the light transmission module 141 and the light reception module 143 to detect an obstacle placed in a front side of the robot cleaner 100, and the obstacle detector 140 may not include the optical sensor module 145 as needed.

The position detector 150 may acquire position information of the robot cleaner 100 based on a movement of the robot cleaner 100 while the robot cleaner 100 drives in the cleaning zone.

The position information of the robot cleaner 100 may be displayed as X, Y coordinates with respect to the docking station 300 that is an initial position, and may include a concept of a direction angle ($\theta$) of the robot cleaner 100. Therefore, the position information of the robot cleaner 100 may be illustrated by (x, y, $\theta$.) In addition, the position information of the robot cleaner 100 may be illustrated by a pose.

Particularly, the position detector 150 may acquire a relative coordinate with respect to the docking station 300 that is an initial position by using various sensors, e.g. an acceleration sensor 151, a gyro sensor 152 and an encoder 153 described below. Positions of relative coordinate acquired via the position detector 150 during the robot cleaner 100 drives may be defined as "first position information".

In the present disclosure, the first position information may represent a relative coordinate with respect to the docking station 300 that is an initial position and detected by the robot cleaner 100 via the position detector 150, and thus the first position information may be different from an actual position of the robot cleaner 100.

A coordinate representing an actual position of the robot cleaner 100 may be defined as "second position information".

The position detector 150 may include the acceleration sensor 151 detecting linear movement information of the robot cleaner 100; the gyro sensor 152 used for detecting a rotation speed of the robot cleaner 100 and measuring a position and variation of direction; and the encoder 153 detecting a rotation of a driving wheel 163 of the driving unit 160.

Particularly, the position detector 150 may detect the acceleration, the movement speed, the displacement and the direction of movement. In addition, the position detector 150 may detect the rotation speed, the rotational displacement and the rotational movement of the rotation radius of the robot cleaner 100 during the robot cleaner 100 performs a rotational movement.

The acceleration sensor 151 may detect linear movement information of the robot cleaner 100. Particularly, the acceleration sensor 151 may detect linear acceleration, linear velocity and linear displacement of the robot cleaner 100 by using Newton's second law of motion (acceleration Law).

The acceleration sensor 151 may employ a piezoelectric type acceleration sensor, a capacitance type acceleration sensor, and a strain gauge-type acceleration sensor.

The piezoelectric type acceleration sensor may include a piezoelectric element outputting an electric signal by mechanical deformation, and may detect the acceleration by using the electric signal output by the piezoelectric element. Particularly, the piezoelectric type acceleration sensor may detect an electric signal output by the piezoelectric element according to deformation of the piezoelectric element due to the acceleration, and may estimate the acceleration from the detected electric signal.

The capacitance-type acceleration sensor may be configured to detect the acceleration by using the fact that a distance between structures is changed by the inertia force, and capacitance is changed due to the variation of the distance. Particularly, the capacitance-type acceleration sensor may include a flowable structure and a fixed structure, and may detect the variation of the capacitance according to the variation of the distance between structures due to the inertia force, thereby estimating the acceleration from the detected variation of the capacitance.

The strain gauge-type acceleration sensor may detect the acceleration by using a strain gauge in which the electrical resistance is converted according to mechanical deformation. Particularly, the strain gauge-type acceleration sensor may detect the variation of the electrical resistance according to the deformation of the structure due to the acceleration, and may estimate the acceleration from the detected variation of the electrical resistance.

In addition, the acceleration sensor 151 may employ a Micro Electro Mechanical System (MEMS) type sensor that is miniaturized by fusing a micro-mechanical, microelectronic and a semiconductor process technology.

The gyro sensor 152 may be called a gyroscope or an angular velocity sensor, and may detect the rotation information of the robot cleaner 100. Particularly, the gyro sensor 152 may detect the rotational angular velocity and the rotational displacement of the detection target by using the law of conservation of angular momentum, Sagnac effect, and Coriolis force.

The gyro sensor 152 may employ a gimbal type gyro sensor, an optical type gyro sensor and a vibration type gyro sensor.

The gimbal type gyro sensor may detect the rotational movement of an object by using the law of angular momentum conservation representing that a rotation object is intended to constantly maintain the rotational axis that is the center of the rotation, and the precession representing that the rotational axis of a rotating object, which rotates due to the rotational reaction force, rotates along a certain trajectory when an external force.

The optical gyro sensor may detect the rotational movement of an object by using Sagnac Effect representing that there is a difference in a time in which a light emitted clockwise and counterclockwise along a circular optical path is reached to a transmission point, due to a rotation of an object.

The vibration type gyro sensor may detect the rotational movement of an object by using the Coriolis force generated by the rotation of the object. Particularly, the vibration type gyro sensor may detect the rotational movement of an object by using the phenomenon that a vibrating object is vibrated in a new direction due to the Coriolis force when a vibrating object is rotated in a certain direction.

The gyro sensor 152 also may employ a Micro Electro Mechanical System (MEMS) sensor. For example, a capacitance-type gyro sensor among MEMS-type gyro sensors may detect the variation of the capacitance according to a deformation of micro-mechanical structure due to the Coriolis force that is proportional to the rotational speed, and may estimate the rotational speed based on the variation of the capacitance.

The encoder 153 may include a light emitting element emitting a light, a light receiving element receiving a light, a rotation slit and a fixation slit provided between the light emitting element and the light receiving element, and an encoder controller detecting a rotational speed and a rotational displacement of the rotation slit. The rotation slit may be provided to be rotated with the driving wheel 163, and the fixation slit may be provided to be fixed to the main body 101.

Due to a rotation of the rotation slit, a light emitted from the light emitting element may be passed through the rotation slit and reached to the light receiving element, or blocked by the rotation slit. According to the rotation of the rotation slit, the light receiving element may receive a pulse type light and output an electrical signal based on the received light.

The encoder controller may estimate a rotational speed and a rotational displacement of the driving wheel 163 based on the electrical signal output by the light receiving element, may estimate a linear motion speed, a linear displacement, a rotational movement speed, a rotational displacement of the robot cleaner 100 based on the rotational speed and the rotational displacement of the driving wheel 163, and may provide them to the controller 110 described later.

As illustrated in FIGS. 3 to 4, the driving unit 160 may move the robot cleaner 100 and may include a wheel driving motor 161, and a driving wheel 163 and a caster wheel 165.

The driving wheel 163 may be provided opposite ends of the bottom surface of the main body 101, and may include a left driving wheel 163a provided in the left side of the robot cleaner 100 with respect to a front side of the robot cleaner 100, and a right driving wheel 163b provided in the right side of the robot cleaner 100 with respect to the front side of the robot cleaner 100.

The driving wheel 163 may move the robot cleaner 100 by receiving a rotational force from the wheel driving motor 161.

The wheel driving motor 161 may generate a rotational force configured to drive the driving wheel 163, and may include a left driving motor 161a rotating the left driving wheel 163a, and a right driving motor 161b rotating the right driving wheel 163b.

The left driving motor 161a and the right driving motor 161b may be individually operated by receiving a driving control signal from the robot cleaner 100.

The left driving wheel 163a and the right driving wheel 163b may individually rotate by the left driving motor 161a and the right driving motor 161b, which are individually operated.

In addition, since the left driving wheel 163a and the right driving wheel 163b individually rotate, the robot cleaner 100 may perform a variety of driving, e.g. driving forward and backward, a rotational driving, and a spinning.

For example, when both of the left and right driving wheel 163a and 163b rotates in a first direction, the robot cleaner 100 may perform a linear driving in a front side (driving forward) and when both of the left and right driving wheel 163a and 163b rotates in a second direction, the robot cleaner 100 may perform a linear driving in a rear side (driving backward)

When the left and right driving wheel 163a and 163b rotates in the same direction at a different speed, the robot cleaner 100 may rotationally drive in the right side or the left side, and when the left and right driving wheel 163a and 163b rotates in a different direction, the robot cleaner 100 may rotate clockwise and counterclockwise in a its place.

The caster wheel 165 may be installed in the bottom surface of the main body 101 so that a rotation shaft of the caster wheel 165 may rotate according to a moving direction of the robot cleaner 100. The caster wheel 165 whose the rotation shaft rotates according to a moving direction of the robot cleaner 100 may not interrupt a driving of the robot cleaner 100 so that the robot cleaner 100 may drive while maintaining a stable position.

In addition, the driving unit 160 may further include a motor driving circuit (not shown) supplying a driving current to the driving wheel 163 according to a control signal of the controller 110; a power transmission module (not shown) transmitting the rotational force of the wheel driving motor 161 to the driving wheel 163; a rotation detecting sensor (not shown) detecting a rotational displacement and a rotational speed of the wheel driving motor 161 or the driving wheel 163.

The cleaning unit 170 may include a drum brush 173 scattering a dust on the cleaning floor; a brush driving motor 171 rotating the drum brush 173; a dust suction fan 177 suctioning the scattered dust; a dust suction motor 175 rotating the dust suction fan 177; and a dust box 179 storing the suctioned dust.

Figure 5:
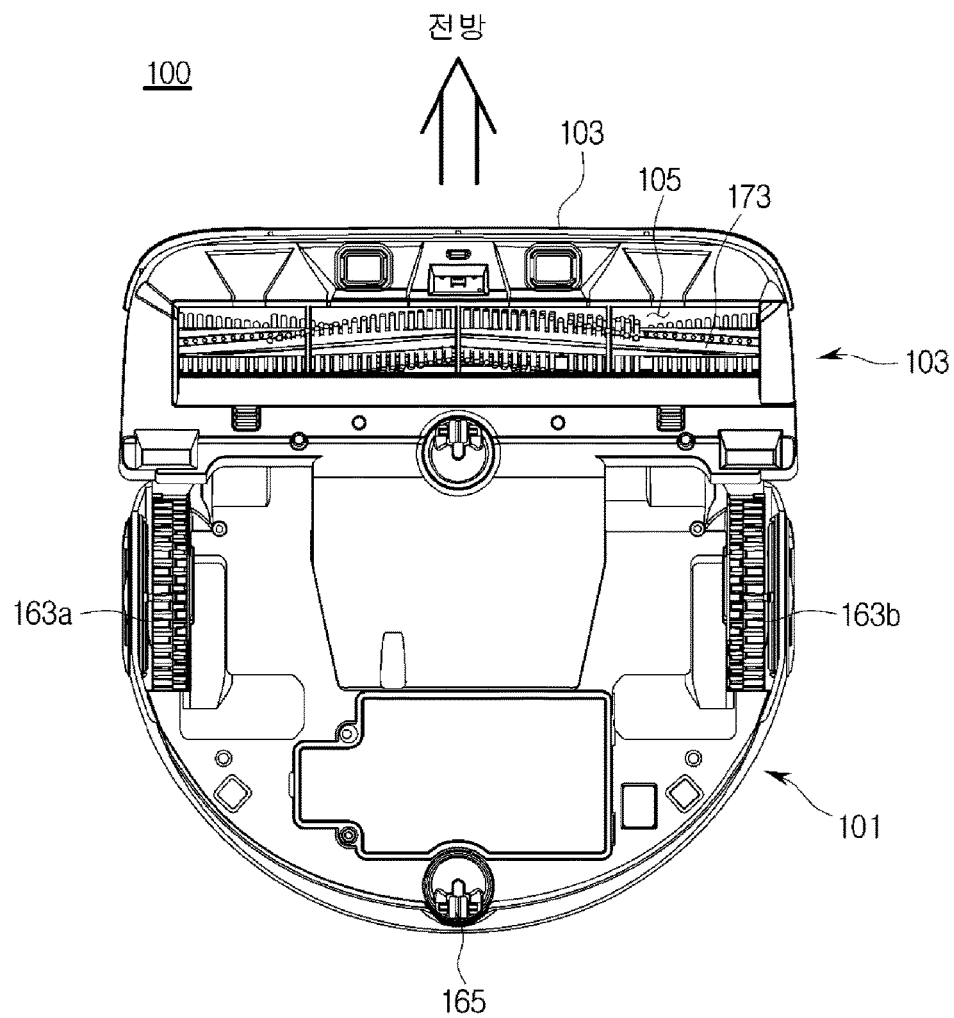
FIG. 5 is a view illustrating a bottom surface of a robot cleaner.
Figure 6:
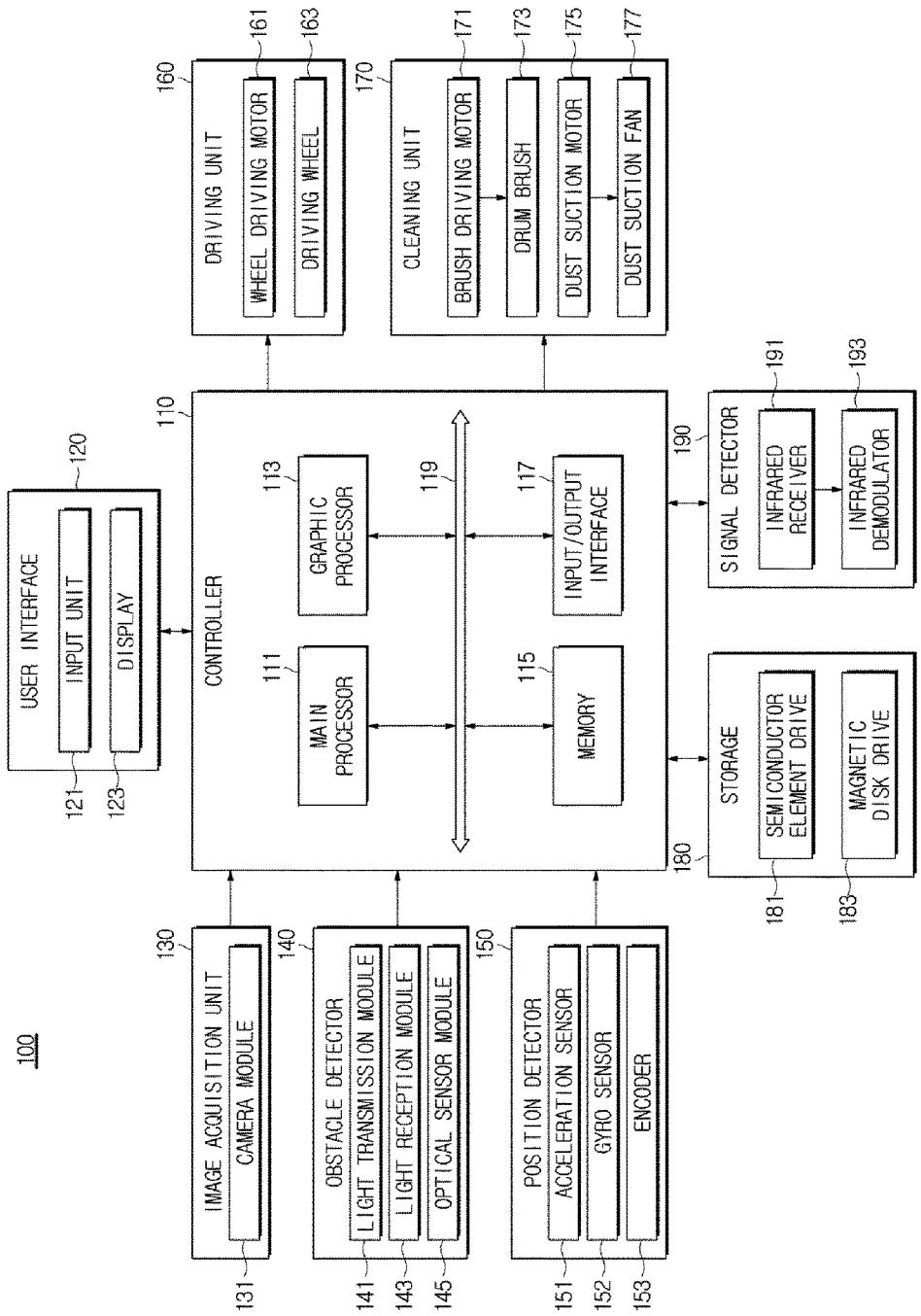
FIG. 6 is a view illustrating a control configuration of a robot cleaner.

As illustrated in FIG. 5, the drum brush 173 may be provided in a dust inlet 105 formed in the bottom surface of the sub-body 103. The drum brush 173 may scatter dust on the cleaning floor to the inside of the dust inlet 105 while rotating with respect to a rotational shaft provided on a level with the bottom of the sub body 103.

The brush driving motor 171 may be provided adjacent to the drum brush 173 to rotate the drum brush 173 according to a cleaning control signal of the controller 110.

Although not shown in the drawings, the cleaning unit 170 may further include a motor driving circuit (not shown) supplying a driving current to the brush driving motor 171 according to a control signal of the controller 110; and a power transmission module (not shown) transmitting the rotational force of the brush driving motor 171 to the drum brush 173.

As illustrated in FIGS. 3 and 4, the dust suction fan 177 may be provided in the main body 101 to suction dust that is scattered by the drum brush 173 to the dust box 179.

The dust suction motor 175 may be provided adjacent to the dust suction fan 177 and configured to rotate the dust suction fan 177 according to a control signal of the controller 110.

Although not shown in the drawings, the cleaning unit 170 may further include a motor driving circuit (not shown) supplying a driving current to the dust suction motor 175 according to a control signal of the controller 110; and a power transmission module (not shown) transmitting the rotational force of the dust suction motor 175 to the dust suction fan 177.

As illustrated in FIGS. 3 and 4, the dust box 179 may be provided in the main body 101 to store dust that is suctioned by the dust suction fan 177.

The cleaning unit 170 may include a dust guide pipe guiding dust that is suctioned via the dust inlet 105 of the sub body 103 to the dust box 179 provided in the main body 101.

The storage 180 may store the first position information that is a relative coordinate with respect to the docking station 300 that is an initial position of the robot cleaner 100, which is acquired by the position detector 150; control programs; and control data for the control of the robot cleaner 100. The storage 180 may store map information of the cleaning zone generated by using the first position information acquired during the robot cleaner 100 drives.

The storage 180 may operate as an auxiliary memory configured to assistant a memory 115 included in the robot cleaner 100 described later, and may be configured with a nonvolatile memory in which stored data is not disappeared although the power of the robot cleaner 100 is blocked.

The storage 180 may include a semiconductor element drive 181 storing data in a semiconductor element and a magnetic disk drive 183 storing data in a magnetic disk drive.

The signal detector 190 may detect an infrared output signal of the docking station 300 to identify a direction in which the docking station 300 is placed, based on the detected direction.

The intensity of the infrared output signal of the docking station 300 may vary according to a distance between the robot cleaner 100 and the docking station 300. Therefore, when the distance between the robot cleaner 100 and the docking station 300 is short, the signal detector 190 may detect a high intensity of the infrared output signal and when the distance between the robot cleaner 100 and the docking station 300 is long, the signal detector 190 may detect a low intensity of the infrared output signal.

The signal detector 190 may detect at least one of a proximity signal, a mid-distance signal, a front signal, and an omnidirectional signal, which are differently output according to each position of a sensor installed in the docking station 300.

For this, the signal detector 190 may include a plurality of infrared receiver 191; 191a, 191b, 191c, 191d, 191e, and 191f configured to receive an infrared light emitted from the docking station 300.

The plurality of infrared receiver 191a to 191f may include a left rear infrared receiver 191a provided in the left rear side; a left infrared receiver 191b provided in the left rear side; a left front infrared receiver 191c provided in the left front side; a right front infrared receiver 191d provided in the right front side; a right infrared receiver 191e provided in the right side; and a right rear infrared receiver 191f provided in the right rear side.

The plurality of infrared receiver 191a to 191f may be provided along an edge of the robot cleaner 100 to receive an infrared light that is transmitted in every direction.

The signal detector 190 may differently detect an infrared output signal of the docking station 300 according to a position of the infrared receiver that receives an infrared light emitted from the docking station 300, among the plurality of infrared receiver 191a to 191f.

A method for determining a direction of a position of the docking station 300 according to a position of an infrared receiver that receives an infrared light emitted from the docking station 300 will be described in the controller 110 of the robot cleaner 100 in the following.

The signal detector 190 may further include an infrared demodulator 193 configured to demodulate the infrared light received by the plurality of infrared receiver 191a to 191f to acquire a user's control command.

The infrared demodulator 193 may be configured to demodulate an infrared light received by the infrared receiver 191. An infrared modulator (not shown) included in the device 200 may modulate an infrared light according to a user's control command, and the infrared demodulator 193 may demodulate the infrared light that is modulated by the device 200 thereby acquiring the user's control command. In addition, the infrared demodulator 193 may provide the acquired control command to the controller 110.

The controller 110 may control an overall operation of the robot cleaner 100.

Particularly, the controller 110 may include an input/output interface 117 mediating an input and output of data between the controller 110 and components included in the robot cleaner 100; a memory 115 memorizing programs and data; a graphic processor 113 performing an image processing; a main processor 111 performing an operation according to the program and data memorized in the memory 115 and correcting the first position information of the robot cleaner 100; and a system bus 119 operated as a path of data transmission and reception among the input/output interface 117, the memory 115, the graphic processor 113 and the main processor 111.

The input/output interface 117 may receive an image received from the image acquisition unit 130, a result of detecting obstacle detected by the obstacle detector 140, and a result of detecting touch detected by the position detector 150, and transmit the image, the result of detecting obstacle, and the result of detecting touch to the main processor 111, the graphic processor 113, and the memory 115 via the system bus 119.

In addition, the input/output interface 117 may transmit a variety of control signals output by the main processor 111 to the driving unit 160 or the cleaning unit 170.

The memory 115 may call control programs and control data, which is to control an operation of the robot cleaner 100, from the storage 180 to memorize the control programs and control data, and temporarily memorize an image acquired by the image acquisition unit 130 or the result of detecting obstacle detected by the obstacle detector 140.

The memory 115 may include a volatile memory, e.g. S RAM, and D RAM, but is not limited thereto. Therefore, the memory 115 may include a nonvolatile memory, e.g. flash memory, Read Only Memory (RAM), Erasable Programmable Read Only Memory (EPROM), and Electrically Erasable Programmable Read Only Memory (EEPROM).

The graphic processor 113 may convert an image acquired by the image acquisition unit 130 into a format that is storable in the memory 115 or the storage 180, or change the resolution and the size of the image acquired by the image acquisition unit 130.

The graphic processor 113 may convert a reflection light image acquired by the position detector 150 into a format that is processable by the main processor 111.

Hereinafter It is assumed that a process and an operation process of the main processor 111 described later may correspond to a process and an operation process of the controller 110.

The main processor 111 may process a result of detection by the image acquisition unit 130, the obstacle detector 140 and the position detector 150 according to the program and data stored in the memory 115, control the driving unit 160 and the cleaning unit 170, correct a position of the robot cleaner 100, and perform an operation process to correct a map based on the corrected position of the robot cleaner 100.

The main processor 111 may generate a map in real time based on the first position information that is a relative coordinate with respect to the docking station 300 that is an initial position, which is acquired by the position detector 150 during the robot cleaner 100 drives.

The main processor 111 may generate a map based on the position information of the robot cleaner 100 by receiving the first position information that is a relative coordinate with respect to the docking station 300 that is an initial position, stored in the storage 180.

When the first information that is a relative coordinate with respect to the docking station 300 that is an initial position is corrected by the main processor 111, the main processor 111 may update a previous map to a new map based on the corrected position information.

For example, the main processor 111 may estimate a position of the robot cleaner 100 based on the image acquired by the image acquisition unit 130 or estimate a direction, a distance and a size of an obstacle based on the image acquired by the obstacle detector 140.

The main processor 111 may perform an operation to determine whether to avoid an obstacle or to make contact with an obstacle according to the direction, the distance and the size of the obstacle.

When it is determined that the robot cleaner 100 avoids the obstacle, the main processor 111 may estimate a driving path to avoid the obstacle.

The main processor 111 may store the first position information that is a relative coordinate with respect to the docking station 300 in the storage 180 as well as acquiring a driving path of the robot cleaner 100 during the robot cleaner 100 drives.

When the robot cleaner 100 detects an infrared output signal of the docking station 300 via the signal detector 190, the main processor 111 may identify a type, an intensity and a direction of an infrared output signal.

The main processor 111 may acquire a distance to the docking station 300 by using a proximity infrared output signal, a mid-distance infrared output signal, and an omni-directional infrared output signal of the docking station 300 that is detected via the signal detector 190. A detail description of a method to acquire a distance will be described later with reference to FIG. 8.

The main processor 111 may acquire a distance to the docking station 300 by measuring an intensity of the infrared output signal of the docking station 300.

Particularly, the main processor 111 may estimate a distance between the robot cleaner 100 and the docking station 300 by determining whether an intensity of the infrared output signal is identical to a predetermined intensity corresponding to a distance, by measuring the infrared output signal of the docking station 300.

The main processor 111 may acquire a direction in which the docking station 300 is placed by acquiring a direction in which the infrared output signal of the docking station 300 is detected, via the signal detector 190.

For example, the main processor 111 may determine that the docking station 300 is placed in a direction of a reception region that is determined by dividing an region in which an infrared output signal is received and an region in which an infrared output signal is not received according to a position of the plurality of infrared signal receiver installed in the robot cleaner 100. A detailed description thereof will be described later with reference to FIG. 14.

When it is determined that each of the plurality of infrared signal receiver installed in the robot cleaner 100 receives an infrared output signal of the docking station 300, the main processor 111 may determine that the docking station 300 is placed in a direction in which the infrared signal receiver receiving the highest intensity of infrared output signal is placed, among the plurality of infrared signal receiver.

As mentioned above, since the main processor 111 identifies a distance between the robot cleaner 100 and the docking station 300 and a direction in which the docking station 300 is placed, the main processor 111 may estimate a position of the docking station 300.

The main processor 111 may detect an infrared output signal of the docking station 300 via the signal detector 190 and then acquire a position of the docking station 300 by using the geometrical method or probability based method.

Particularly, the geometrical method is a method to acquire a position of the docking station 300 in a way that when the robot cleaner 100 detects an infrared output signal of the docking station 300 via the signal detector 190, the robot cleaner 100 estimates a straight line equation about directions of the detected infrared output signal of the docking station 300 while moving along multiple points, and the robot cleaner 100 determines a point in which the linear equation is intersected as a position of the docking station 300.

The probability based method is a method to acquire a position of the docking station 300 in a way that when the robot cleaner 100 detects an infrared output signal of the docking station 300 via the signal detector 190, the robot cleaner 100 performs a filtering the infrared output signal of the docking station 300 according to the probability based filtering method using Bayse filter to estimate a direction of the detected infrared output signal, and acquires a position of the docking station 300.

A detailed description thereof will be described later with reference to FIGS. 15 and 16.

The main processor 111 may estimate a current position of the robot cleaner 100 in which the robot cleaner 100 is practically placed, based on a position of the docking station 300 that is an initial position and stored in the storage 180, and an infrared output signal of the docking station 300 that is detected during the robot cleaner 100 drives.

As mentioned above, the main processor 111 may acquire a position of the docking station 300 by measuring a direction in which the docking station 300 is placed and a distance between the robot cleaner 100 and the docking station 300, or may acquire a position of the docking station 300 using the geometrical method or probability based method by measuring an infrared output signal of the docking station 300. Therefore, the main processor 111 may estimate a current position of the robot cleaner 100 in which the robot cleaner 100 is practically placed using a relative positional relationship between the robot cleaner 100 and the docking station 300.

Hereinbefore a coordinate representing an actual position of the robot cleaner 100 may be referred to as "second position information". There may be a difference between the first position information acquired by the position detector 150 and the second position information.

The main processor 111 may correct the first position information of the body so that a difference between the first position information, which is acquired by the position detector 150 during the robot cleaner 100 drives, and the second position information is minimized.

A detailed description thereof will be described with reference to FIGS. 10A and 10B.

The main processor 111 may generate a driving control data, which is then provided to the driving unit 160 so that the robot cleaner 100 is moved according to an estimated driving path.

The controller 110 may control the driving unit 160 so that the robot cleaner 100 drives on the cleaning floor, and the controller 110 may control the cleaning unit 170 so that the robot cleaner 100 cleans the cleaning floor while driving.

The controller 110 may detect a position and a size of an obstacle based on an obstacle detection signal of the obstacle detector.

The device 200 may be a remote control device configured to transmit a control command in a wireless method to control a movement of the robot cleaner 100 and to allow an operation of the robot cleaner 100 to be performed, and may include Cellphone (PCS phone), smart phone, Personal digital Assistants (PDA), portable multimedia player (PMP), laptop computer, digital broadcast terminal, netbook, tablet, and navigation.

In addition, the device 200 may include all kinds of devices, e.g. a wired or wireless communication function built-in digital camera and camcorder, capable of implementing various functions using a variety of applications.

The device 200 may be a typical remote controller having a simple shape. A remote controller may typically transmit and receive a signal to and from the robot cleaner 100 using infrared Data Association (IrDA)

The device 200 may transmit and receive a wireless communication signal to and from the robot cleaner 100 by using a variety of methods, e.g. Radio Frequency (RF), Wireless Fidelity (Wi-Fi), Bluetooth, Zigbee, near field communication (NFC), Ultra Wide Band (UWB), but is not limited thereto. The device 200 may use any kind method as long as transmitting and receiving a wireless communication signal to and from the robot cleaner 100.

The device 200 may include a power button turning on/off the power of the robot cleaner 100; a charge return button instructing to return to the docking station for charging the battery of the robot cleaner 100; a mode button changing a control mode of the robot cleaner 100; a start/stop button starting/stopping an operation of the robot cleaner 100 or starting, canceling and confirming a control command; and a dial.

Figure 7:
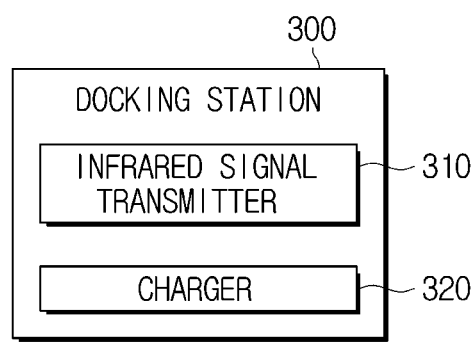
FIG. 7 is a view illustrating a configuration of a docking station in accordance with an embodiment of the present disclosure.
Figure 8:
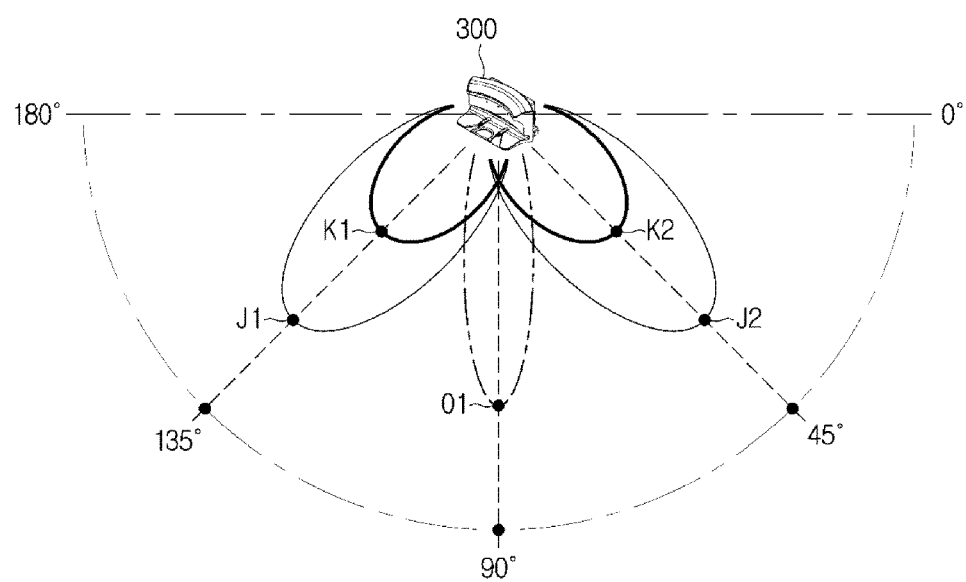
FIG. 8 is a view illustrating a type and a range of an infrared signal output from a docking station in accordance with an embodiment of the present disclosure.

FIG. 7 is a view illustrating a configuration of a docking station in accordance with an embodiment of the present disclosure. FIG. 8 is a view illustrating a type and a range of an infrared signal output from a docking station in accordance with an embodiment of the present disclosure.

Hereinafter a configuration and an operation of a docking station will be described in details with reference to FIGS. 7 and 8.

Referring to FIG. 7, the docking station 300 may be configured to charge a battery of the robot cleaner 100, and may include an infrared signal transmitter 310 and a charger 320.

The infrared signal transmitter 310 may be installed adjacent to an accommodation part of the docking station 300 to transmit an infrared light signal and an ultrasonic signal. The robot cleaner 100 may recognize that the robot cleaner 100 is closing to the docking station 300 according to the signal of the infrared signal transmitter 310. However, a signal output from the docking station 300 may be not limited to an infrared light signal and an ultrasonic signal, and may include a variety of signals.

The charger 320 may convert an alternating current input from the outside into a current configured to charge the battery of the robot cleaner 100, and thus the charger 320 may charge the battery of the robot cleaner 100.

The docking station 300 may include a guide member (not shown) configured to guide docking of the robot cleaner 100, and the guide member (not shown) may include a connection terminal (not shown) to charge the robot cleaner 100 via the charger provided in the robot cleaner 100.

A reception range of an infrared signal output from the docking station 300 may vary according to an installation location of an infrared output module (not shown) which outputs the infrared signal. In addition a reception intensity of an infrared signal output from the docking station 300 may vary according to a distance from the docking station 300.

When the robot cleaner 100 enters an infrared signal output range of the docking station 300, during driving, the robot cleaner 100 may acquire a distance between the docking station 300 and the robot cleaner 100 and a position of the docking station 300 based on a reception direction, a type and an intensity of the infrared signal via the controller 110. A detail description of the robot cleaner 100 is described with reference to the controller in the above, and thus will be omitted.

Hereinafter a type and a range of an infrared output signal of the docking station 300 will be described in details with reference to FIG. 8. It is assumed that the docking station 300 is installed on a wall, but it is for an example. Thus, the docking station 300 may be installed or placed in any location.

An infrared signal output region may be defined as a semicircle with respect to the docking station 300.

When it is assumed that along a wall, one end point of an region in which an infrared signal is influenced is a start point and the position of the end point is 0 (zero) degree, a position of the other end point of the region in which an infrared signal is influenced, which is opposite to the one end point, may be 180 degree.

The infrared output region of the docking station 300 may vary according to a setting, and the infrared signal may be output sufficiently far according to the intensity of the signal.

However, in FIG. 8, it is assumed that the infrared output region of the docking station 300 is a semicircle having 5 m of radius.

A proximity infrared signal output from the docking station 300 may be output by 1 m in an oval shape in a direction of 45 degree and 135 degree of one end point (K1 and K2) with respect to a position of the docking station 300.

In addition, when the controller 110 of the robot cleaner 100 detects a proximity infrared signal via the signal detector 190 during the robot cleaner 100 drives, the controller 110 may determine that the docking station 300 is placed within approximately 1 m and thus the robot cleaner 100 may apply the fact that the docking station 300 is placed within approximately 1 m to measure a distance to the docking station 300.

A mid-distance infrared signal output from the docking station 300 may be output by 3 m in an oval shape in a direction of 45 degree and 135 degree of one end point (J1 and J2) with respect to a position of the docking station 300.

Therefore, the signal detector 190 of the robot cleaner 100 may not detect the proximity infrared signal unless the robot cleaner 100 drives to an oval shape in an inside of a range to which the mid-distance infrared signal is output. Accordingly, the controller 110 of the robot cleaner 100 may estimate a distance from the docking station 300 by using this fact.

A front side infrared signal output from the docking station 300 may be output by 3 m in an oval shape in a direction of 90 degree of one end point (O1) with respect to a position of the docking station 300. When the controller 110 of the robot cleaner 100 detects the front side infrared signal during the robot cleaner 100 drives, the controller 110 may determine that the docking station 300 is placed in a straight line of the detected direction and thus the controller 110 of the robot cleaner 100 may estimate a distance from the docking station 300.

An omnidirectional infrared signal output from the docking station 300 may be output by 5 m in a semi-circular shape with respect to a position of the docking station 300. When the controller 110 of the robot cleaner 100 detects the omnidirectional infrared signal via the signal detector 190 during the robot cleaner 100 drives, the controller 110 may determine that the docking station 300 is placed within approximately 5 m and thus the robot cleaner 100 may apply the fact that the docking station 300 is placed within approximately 5 m to measure a distance to the docking station 300.

A range of up to 1 m, 3 m, and 5 m of the infrared signal is exemplary and thus the range may have a less distance or a longer distance. In addition, the intensity of the proximity infrared signal, mid-distance infrared signal, and omnidirectional infrared signal output from the docking station 300 may vary according to the distance.

The above mentioned description is to explain that the robot cleaner 100 uses the type and intensity of the infrared output signal output from the docking station 300 to estimate a distance to the docking station 300.

Figure 9:
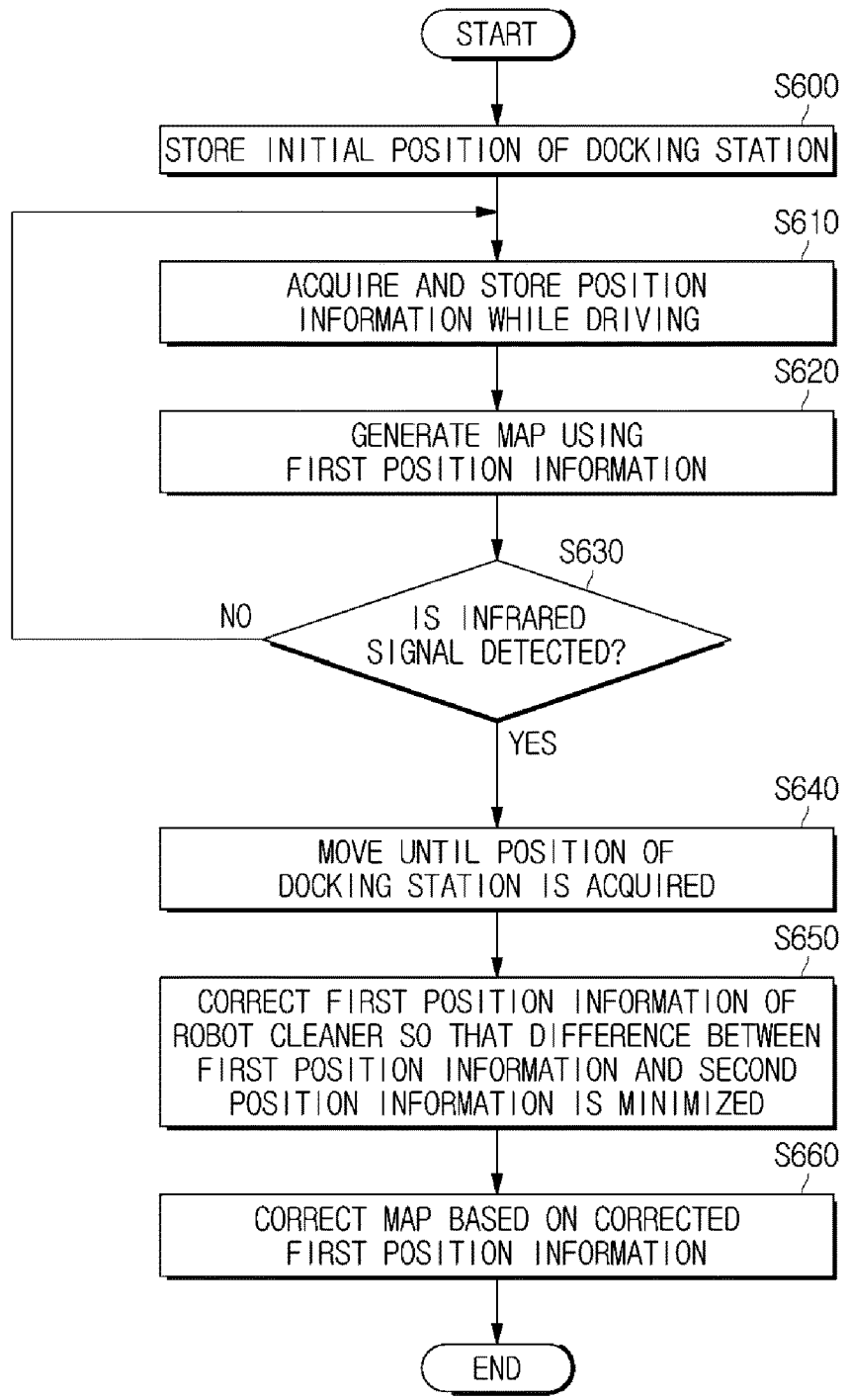
FIG. 9 is a flow chart illustrating of correcting a map by acquiring a position of a docking station of a robot cleaner in accordance with an embodiment.

FIG. 9 is a flow chart illustrating of correcting a map by acquiring a position of a docking station of a robot cleaner in accordance with an embodiment.

Figure 10A:
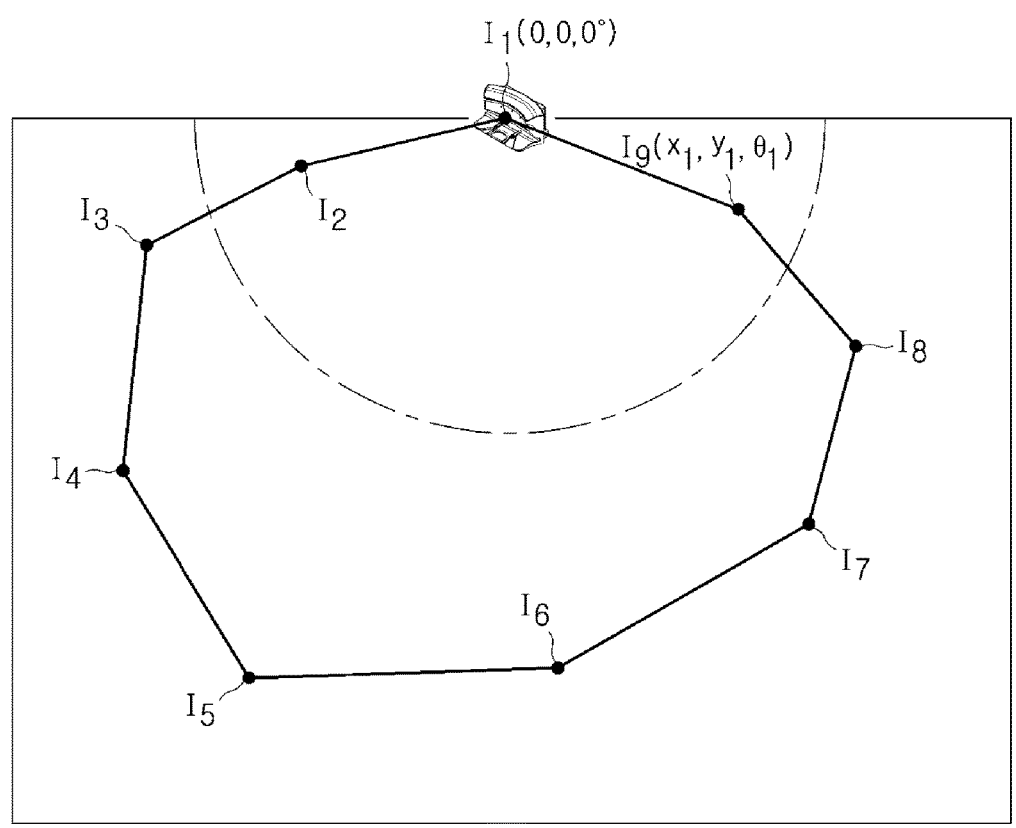
FIGS. 10A and 10B are views illustrating a method for correcting a position and a map of a robot cleaner in accordance with an embodiment.
Figure 10B:
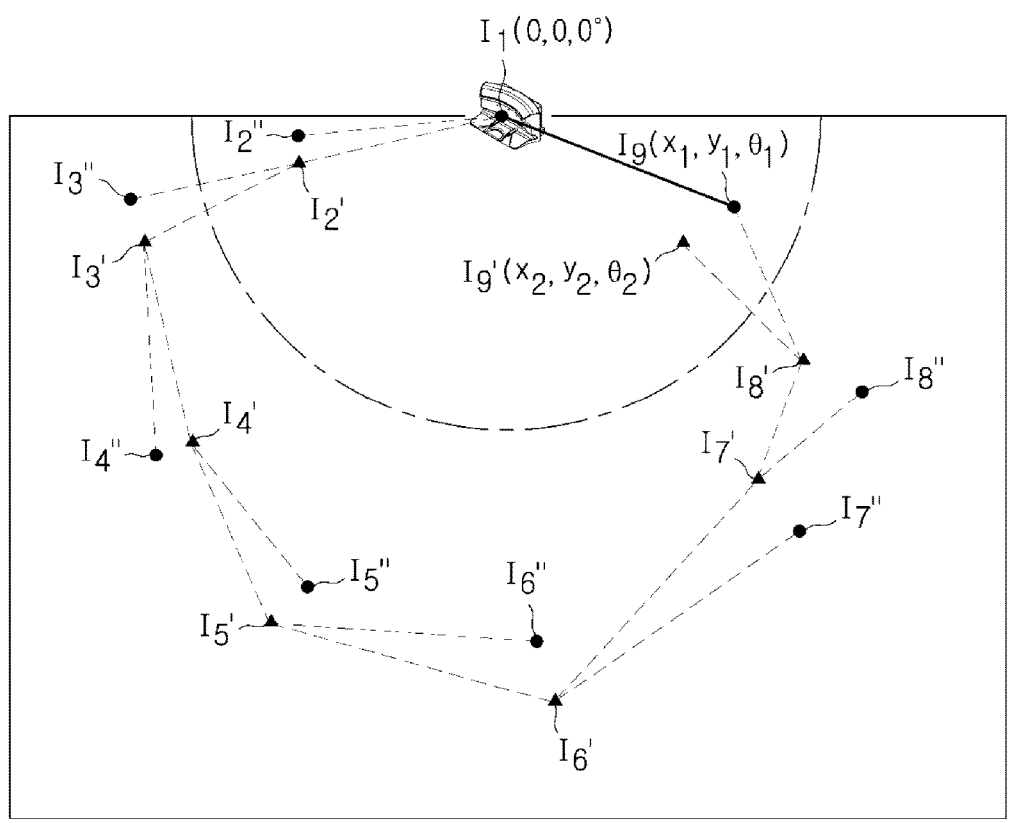

FIGS. 10A and 10B are views illustrating a method for correcting a position and a map of a robot cleaner in accordance with an embodiment. Particularly, FIG. 10A illustrates an actual driving trajectory of a robot cleaner without an error, and FIG. 10B illustrates a driving trajectory of a robot cleaner in which an error occurs.

Hereinafter an overall operation of a process of correcting a map performed by a robot cleaner will be described with reference to FIGS. 9 to 10B.

An operation of the robot cleaner 100 described in the following may correspond to a control operation of the robot cleaner 100. However, the same operations as described above will be briefly explained.

The robot cleaner 100 may store position information of the docking station 300 that is an initial position prior to driving, in the storage 180 (600).

Referring to FIGS. 10A and 10B, it is assumed that position information (I1) of the docking station 300 that is an initial position prior to driving is (0,0,0°). In this case, the initial position may typically represent a position of the docking station 300, but is not limited thereto.

The robot cleaner 100 may start a driving in a position of the docking station 300 that is an initial position, acquire first position information of the robot cleaner 100 via the position detector 150, and store the acquired first position information in the storage 180 (610). As mentioned above, the first position information may represent relative position information of the robot cleaner 100 with respect to the docking station 300.

The robot cleaner 100 may start a driving in a position of the docking station 300 that is an initial position, acquire the first position information of the robot cleaner 100 via the acceleration sensor 151, the gyro sensor 152, and the encoder 153 of the position detector 150. In addition, the robot cleaner 100 may acquire position information by using an image provided from the image acquisition unit 130.

Therefore, referring to FIG. 10B, a driving trajectory of the robot cleaner 100 illustrated by a dotted line may be formed by connecting from a position information point (I1') to a position information point (I9').

Referring to FIG. 10A, a driving trajectory of the robot cleaner 100 illustrated by a solid line may be formed by connecting from a position information point (I1) to a position information point (I9) and represent an actual driving trajectory of the robot cleaner 100.

Therefore, the first position information may be different from an actual position of the robot cleaner 100.

The robot cleaner 100 may generate a map of a driving trajectory via the controller 110 based on the first position information of the relative coordinate acquired by the position detector 150, and store the generated map in the storage 180 (620).

Referring to FIG. 10B, the driving trajectory illustrated by a dotted line may represent a map generated by the controller 110 based on from the position information point (I1') to the position information point (I9') of a relative coordinate that is currently measured by the position detector 150. The driving trajectory may be different from an actual driving trajectory of the robot cleaner 100.

The robot cleaner 100 may determine whether to detect an infrared output signal of the docking station 300 via the signal detector 190 during the robot cleaner 100 drives (630).

When the infrared output signal is determined to be detected (YES of 630), the robot cleaner 100 may acquire a position of the docking station 300 via the controller 110 by using the infrared output signal of the docking station 300 (640).

Particularly, referring to FIG. 10B, when the robot cleaner 100 starts a driving in a first position (I1), that is a position of the docking station 300 and an initial position, and reaches a ninth position (I9), the signal detector 190 may detect an infrared output signal of the docking station 300 via the signal detector 190.

In this time, the controller 110 of the robot cleaner 100 may acquire a direction of the docking station 300 based on a direction in which the infrared output signal of the docking station 300 is detected, and then estimate a distance to the docking station 300 based on the type and the intensity of the infrared output signal.

The robot cleaner 100 may acquire a direction of an infrared output signal of the docking station 300 via the signal detector 190, particularly, when some of the plurality of infrared receiver 191a to 191f installed in the robot cleaner 100 detects the infrared output signal, the robot cleaner 100 may determine a direction detected by the infrared receiver as a direction in which the docking station 300 is placed.

When the larger number or all of the plurality of infrared receiver 191a to 191f installed in the robot cleaner 100 detect the infrared output signal, the signal detector 190 may determine that the docking station 300 is placed in a direction in which the infrared output signal is most strongly detected.

The signal detector 190 of the robot cleaner 100 may identify the type of an infrared output signal of the docking station 300. Therefore, when the detected signal is an proximity infrared signal, the signal detector 190 may determine that the docking station 300 is placed within an approximately 1 m, and when the detected signal is a mid-distance infrared signal, the signal detector 190 may determine that the docking station 300 is placed within an approximately 3 m. In addition, when the detected signal is a long distance infrared signal, the signal detector 190 may determine that the docking station 300 is placed within an approximately 5 m.

Therefore, the controller 110 of the robot cleaner 100 may estimate a position of the docking station 300 after determining a direction and a distance of a position of the docking station 300.

The controller 110 of the controller 110 may detect the infrared output signal of the docking station 300 and then estimate a position of the docking station 300 according to the above-mentioned geometrical method or probability based method.

A detail description thereof will be described with reference to FIGS. 15 and 16.

When the controller 110 of the robot cleaner 100 acquires a position of the docking station 300 using the above mentioned methods and it is determined that the position of the docking station 300 is reliable position, it may be determined that the robot cleaner 100 revisits to the position of the docking station 300. It may represent that the controller 110 detects a Loop Closure.

However, although the robot cleaner 100 detects an infrared output signal of the docking station 300 via the signal detector 190 during the robot cleaner 100 drives, when the robot cleaner 100 does not detect a position of the docking station 300 due to a lack of information of the detected infrared output signal, it may be assumed that the robot cleaner 100 does not detect a Loop Closure and thus the robot cleaner 100 may keep driving around a plurality of points until the robot cleaner 100 acquires a position of the robot cleaner 100.

When the controller 110 of the robot cleaner 100 determines that the position of the docking station 300 is a reliable position, during the robot cleaner 100 drives, it may be assumed that the robot cleaner 100 revisits to a position of the docking station 300 that is an initial position. That is, it may be assumed that a Loop closure is detected.

The controller 110 of the robot cleaner 100 may correct the first position information based on the second position information (I9; x1, y1, θ1) that is an actual position (650).

When it is determined that a Loop closure is detected, the controller 110 of the robot cleaner 100 may acquire a current position (I9; x1, y1, θ1) in which the robot cleaner 100 is actually placed, based on position information of the docking station 300 acquired by an infrared output signal and an output signal of the docking station 300, and the position information (I1) of the docking station 300 that is the stored initial position. Hereinbefore it is defined as the second position information.

As illustrated in FIG. 10B, the controller 110 of the robot cleaner 100 may acquire a distance from the robot cleaner 100 to an actual position of the docking station 300 based on a type and an intensity of the infrared output signal output from the docking station 300, with respect to position information of the docking station 300 (I1; 0, 0, 0°) that is an initial position.

Particularly, when it is assumed that an orienting angle is 0° (zero degree) just before the robot cleaner 100 starts a driving in an initial position, it may be determined that a moving angle to drive to a direction of an infrared signal output from the docking station 300 in the second position information (I9; x1, y1, θ1) in which the robot cleaner 100 is actually placed, is a direction angle θ1.

Therefore, the controller 110 may acquire (x1, y1) by using a distance from the docking station 300 to the second position information (I9; x1, y1, θ1) that is a current position of the robot cleaner 100, and a direction angle θ1.

That is, the controller 110 may acquire (I9; x1, y1, θ1) that is actual position information in which an infrared output signal of the robot cleaner 100 is detected.

The controller 110 of the robot cleaner 100 may correct the first position information based on the estimated second position information (I9; x1, y1, θ1) that is a current position of the robot cleaner 100.

Hereinafter a method for correcting with respect to when the robot cleaner 100 detects a loop closure will be described with reference to FIGS. 10A and 10B.

Particularly, the position detector 150 may acquire a relative coordinate from the position information (I1; 0,0,0°) of the docking station 300 that is an initial position by using various sensors, e.g. the acceleration sensor 151, the gyro sensor 152 and the encoder 153 described in the following.

A position of relative coordinate acquired during the robot cleaner 100 drives may be defined as first position information. In addition, the first position information may include measured position information of relative coordinate, and estimated position information of relative coordinate.

That is, the estimated position information of relative coordinate may represent position information when there is no error in a state in which the robot cleaner 100 drives while estimating a next point, in a state in which the robot cleaner 100 drives while acquiring position information via the position detector 150 (position information I1" to position information I9" of FIG. 10B).

The measured position information of relative coordinate may represent position information when there occurs an error in a state in which the robot cleaner 100 drives while estimating a next point, in a state in which the robot cleaner 100 drives while acquiring position information via the position detector 150 (position information I1' to position information I9' of FIG. 10B). The first position information, which is then corrected, may represent position information (I1') to position information (I9')

The controller 110 of the robot cleaner 100 may correct first position information (I8') so that a difference between a difference between the estimated second position information (I9; x1, y1, θ1) that is an actual position of the robot cleaner 100 and measured first position information (I8') including an error, and a difference between measured first position information (I9'; x2, y2, θ2) including an error and the measured first position information (I8') including an error is minimized.

The controller 110 of the robot cleaner 100 may correct first position information (I7') so that a difference between a difference between estimated first position information (I8") when there is no error and measured first position information (I7') including an error, and a difference between the measured first position information (I8') including an error and the measured first position information (I7') including an error is minimized.

The controller 110 of the robot cleaner 100 may correct first position information (I6') so that a difference between a difference between estimated first position information (I7") when there is no error and measured first position information (I6') including an error, and a difference between the measured first position information (I7') including an error and the measured first position information (I6') including an error is minimized.

The controller 110 of the robot cleaner 100 may correct first position information (I5') so that a difference between a difference between estimated first position information (I6") when there is no error and measured first position information (I5') including an error, and a difference between the measured first position information (I6') including an error and the measured first position information (I5') including an error is minimized.

The controller 110 of the robot cleaner 100 may correct first position information (I4') so that a difference between a difference between estimated first position information (I5") when there is no error and measured first position information (I4') including an error, and a difference between the measured first position information (I5') including an error and the measured first position information (I4') including an error is minimized.

The controller 110 of the robot cleaner 100 may correct first position information (I3') so that a difference between a difference between estimated first position information (I4") when there is no error and measured first position information (I3') including an error, and a difference between the measured first position information (I4') including an error and the measured first position information (I3') including an error is minimized.

The controller 110 of the robot cleaner 100 may correct first position information (I2') so that a difference between a difference between estimated first position information (I3") when there is no error and measured first position information (I2') including an error, and a difference between the measured first position information (I3') including an error and the measured first position information (I2') including an error is minimized.

Those descriptions will be represented by a formula in the following.

$$E(X) = \frac{1}{2}\sum_{i'} |\Delta i' - \Delta i''|^2 \qquad \text{Formula 1}$$

E(X) represents a sum of squared errors and means a sum of error of position information of a robot cleaner.

Σ is a symbol of representing a summation and represents a total or a sum. i' represents stored first position information of the robot cleaner 100 and particularly i' may represent (I2') to (I8') with reference to FIG. 10B.

When explaining a point of I7' as an example of ΔI", ΔI" represents a difference between estimated first position information of the robot cleaner 100 (I8") when there is no error and measured first position information (I7') including an error.

When explaining a point of I7' as an example of ΔI', ΔI' represents a difference between measured first position information of the robot cleaner 100 (I8') including an error and measured first position information (I7') including an error. Therefore, when a difference between ΔI' and ΔI' is minimized, E(X) will be minimized.

A map may be corrected with respect to the first position information (I2') to (I8') (not shown) that is corrected so that E(X) is minimized. In this time, the corrected first position information (I2') to (I8') (not shown) may represent a group of pose.

The controller 110 of the robot cleaner 100 may correct the measured first position information (I2' to I8') including an error according to the above-mentioned method.

Therefore, the controller 110 of the robot cleaner 100 may update a map based on the corrected first position information (not shown) (660).

Through the above-mentioned method for correcting, the robot cleaner 100 may acquire a corrected map (FIG. 10A) that is closed to an actual driving trajectory of the robot cleaner 100.

Hereinbefore an overall operation of a process for correcting a map of the robot cleaner 100 is described with reference to FIGS. 9 to 10B.

Hereinafter what the robot cleaner 100 revisits to a position of the docking station 300 that is an initial position during the robot cleaner 100 drives, that is acquiring a position of the docking station 300 to detect a loop closure will be described with reference to the drawings.

Figure 11:
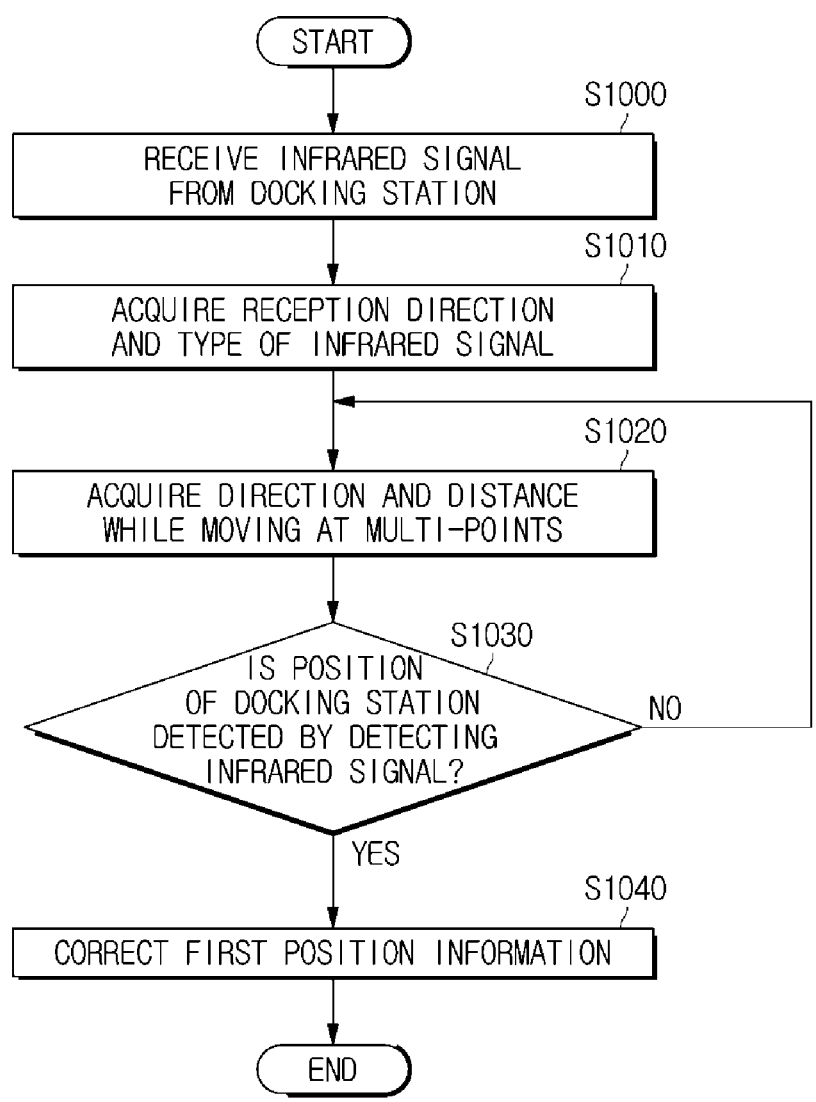
FIG. 11 is flowchart illustrating of acquiring a position of a docking station of a robot cleaner in accordance with an embodiment of the present disclosure.
Figure 12:
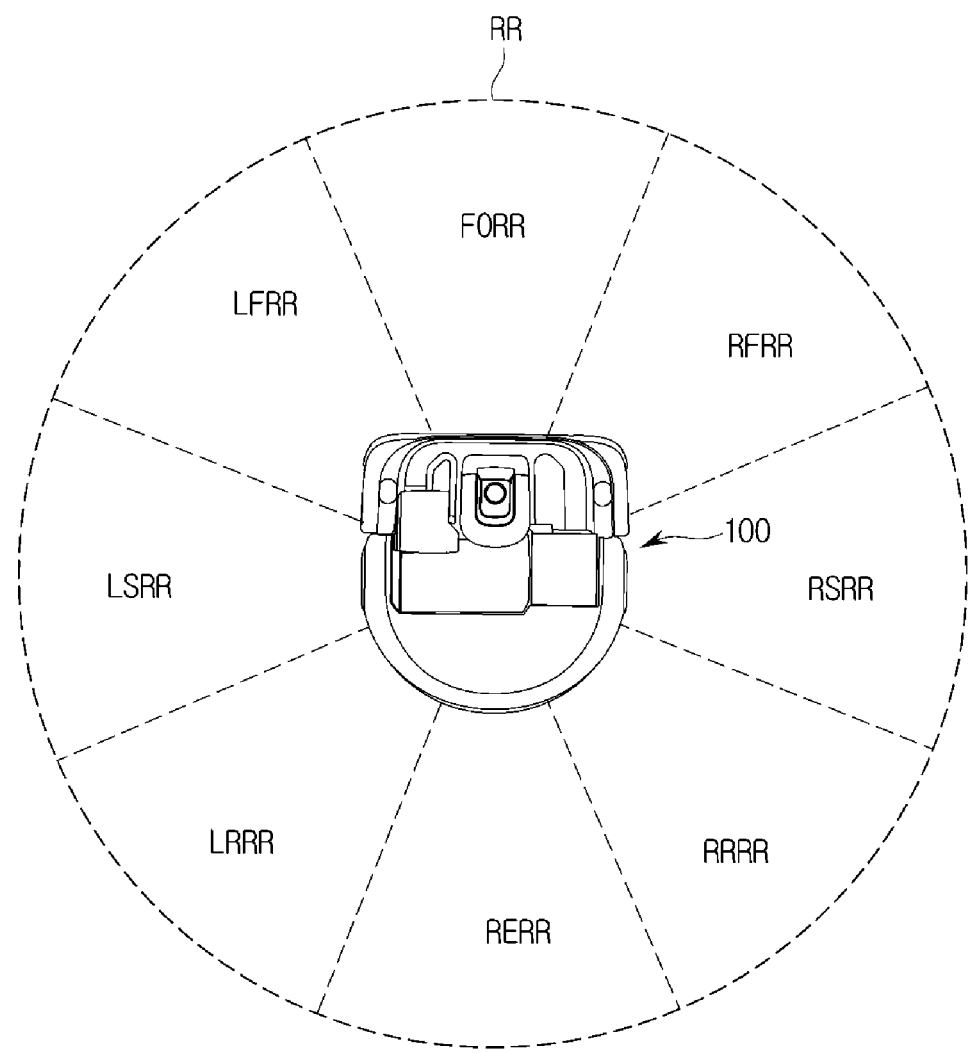
FIG. 12 is a view illustrating a reception region of a plurality of receivers installed in a robot cleaner in accordance with an embodiment of the present disclosure.

FIG. 11 is flowchart illustrating of acquiring a position of a docking station of a robot cleaner in accordance with an embodiment of the present disclosure. In addition, FIG. 12 is a view illustrating a reception region of a plurality of receivers installed in a robot cleaner in accordance with an embodiment of the present disclosure.

Figure 13:
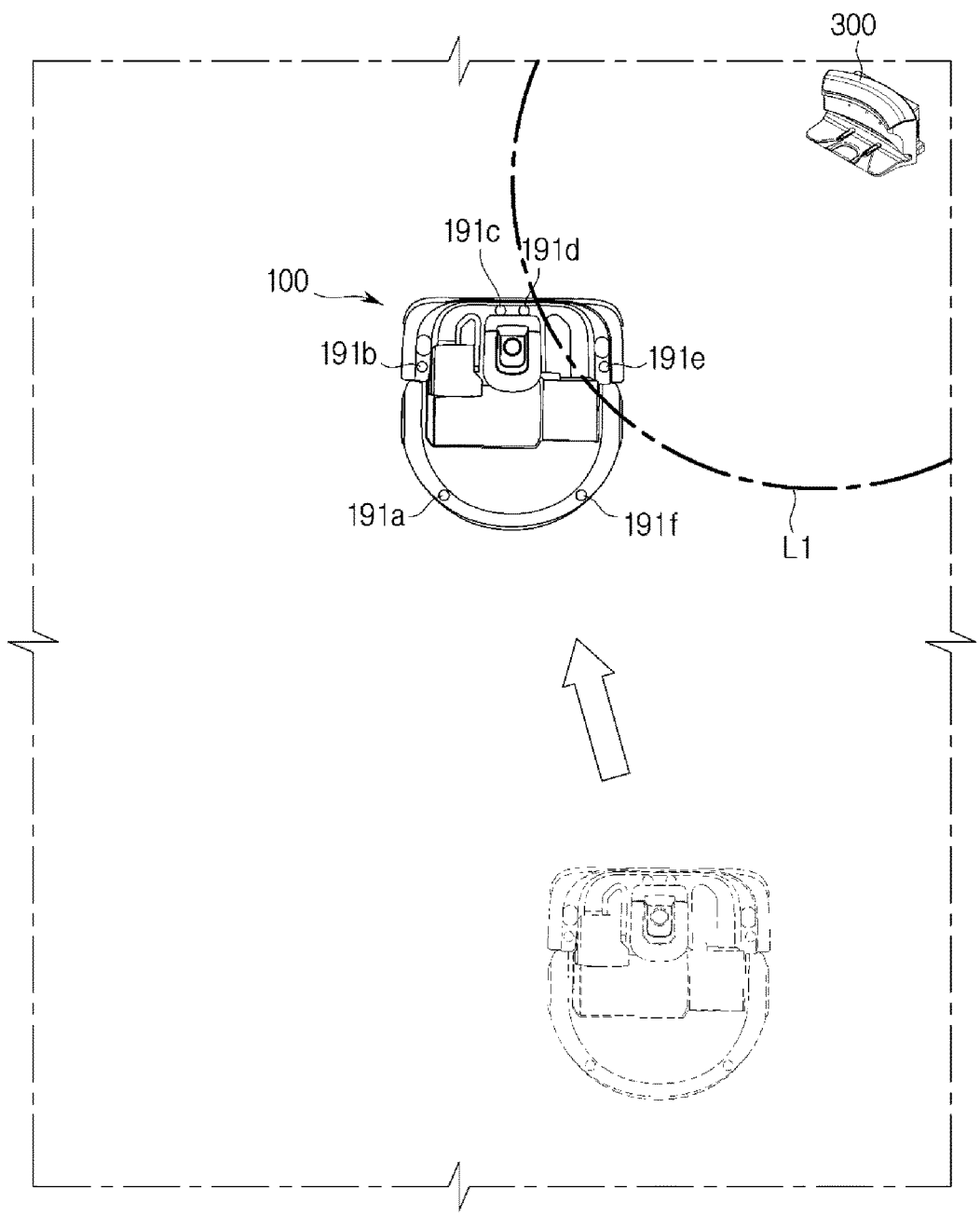
FIG. 13 is a view illustrating a method for detecting an infrared signal output from a docking station of a robot cleaner in accordance with an embodiment of the present disclosure.
Figure 14:
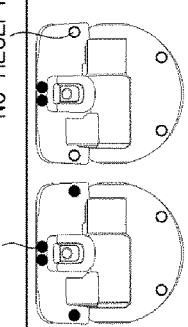
FIG. 14 is a view illustrating a reception region according to a plurality of receivers installed in a robot cleaner in accordance with an embodiment of the present disclosure.

FIG. 13 is a view illustrating a method for detecting an infrared signal output from a docking station of a robot cleaner in accordance with an embodiment of the present disclosure. In addition, FIG. 14 is a view illustrating a reception region according to a plurality of receivers installed in a robot cleaner in accordance with an embodiment of the present disclosure.

Figure 15:
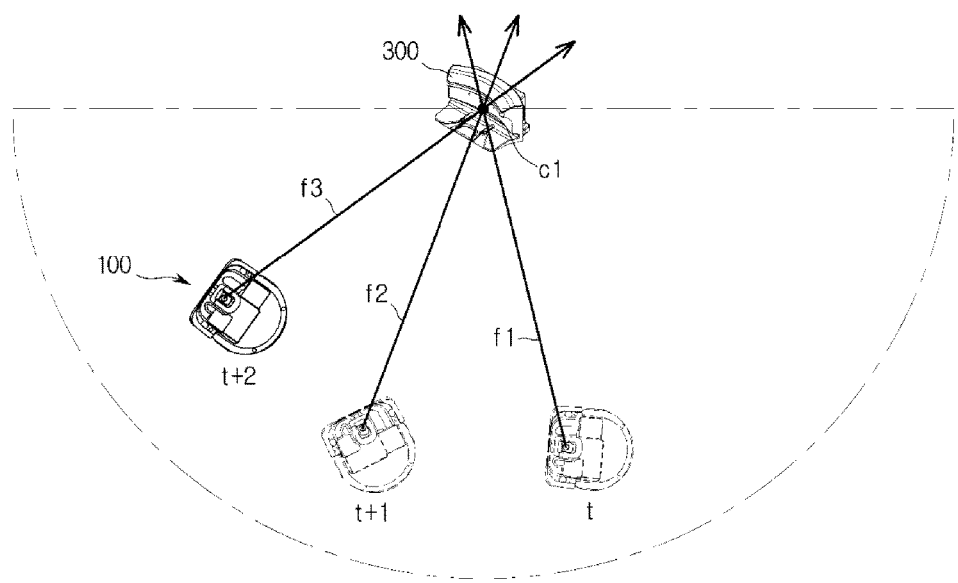
FIG. 15 is a view illustrating an example of a geometrical method to acquire a position of a docking station of a robot cleaner in accordance with an embodiment of the present disclosure.

FIG. 15 is a view illustrating an example of a geometrical method to acquire a position of a docking station of a robot cleaner in accordance with an embodiment of the present disclosure. FIG. 16 is a view illustrating an example of a probability based method to acquire a position of a docking station of a robot cleaner.

Referring to FIGS. 11 to 16, when the robot cleaner 100 detects an infrared output signal of the docking station 300 that is an initial position, after the robot cleaner 100 starts driving in the docking station 300 that is an initial position and then the robot cleaner 100 drives for a certain period of time, the signal detector 190 may receive an infrared signal output from the docking station 300 (1000).

Particularly, the robot cleaner 100 may detect an infrared reception region (RR) via the signal detector 190 by diving eight parts the infrared reception region (RR), as illustrated in FIG. 12.

The infrared reception region (RR) may be divided into a front reception region (FORR) in a front side of the robot cleaner 100, a right front reception region (RFRR) in a right front side of the robot cleaner 100, a right side reception region (RSRR) in a right side of the robot cleaner 100, a right rear reception region (RRRR) in a right rear side of the robot cleaner 100, a rear side reception region (RERR) in a right side of the robot cleaner 100, a left rear reception region (LRRR) in a left rear side of the robot cleaner 100, a left side reception region (LSRR) in a left side of the robot cleaner 100, and a left front reception region (LFRR) in a left front side of the robot cleaner 100.

As illustrated in FIG. 13, when the robot cleaner 100 enters an infrared output signal range (L1) of the docking station 300 during the robot cleaner 100 drives, the signal detector 190 of the robot cleaner 100 may detect an infrared output signal.

In contrast, when the robot cleaner 100 does not enter the infrared output signal range (L1) of the docking station 300 during the robot cleaner 100 drives, the signal detector 190 of the robot cleaner 100 may not detect an infrared output signal.

Therefore, when the signal detector 190 starts detecting an infrared output signal, the robot cleaner 100 may acquire a type, a reception direction, and an intensity of the infrared output signal output from the docking station 300 (1010).

A reception direction of infrared signal may be acquired according to a position of a receiver via the signal detector 190 including a plurality of signal detectors.

For example, referring to FIGS. 12 to 14, when both of a left front infrared receiver 191c and a right front infrared receiver 191d receive an infrared light, the robot cleaner 100 may determine that a position of the docking station 300 is placed in the front side reception region (FORR). That is, the robot cleaner 100 may determine that the docking station 300 is placed in a moving direction thereof.

When a left side infrared receiver 191b and a right side infrared receiver 191e together with the left front infrared receiver 191c and the right front infrared receiver 191d receive an infrared light, the robot cleaner 100 may also determine that the docking station 300 is placed in the front side reception region (FORR).

When the right front infrared receiver 191d receives an infrared light, the robot cleaner 100 may determine that the docking station 300 is placed in the right front side reception region (RFRR).

When the right front infrared receiver 191d and the right side infrared receiver 191e receive an infrared light or when the right front infrared receiver 191d, the right side infrared receiver 191e, and the left front infrared receiver 191c receive an infrared light, the robot cleaner 100 may also determine that the docking station 300 is placed in the right front side reception region (RFRR).

When the right side infrared receiver 191e receives an infrared light, the robot cleaner 100 may determine that the docking station 300 is placed in the right side reception region (RSRR). In addition, when the right side infrared receiver 191e, the right front infrared receiver 191d and a right rear infrared receiver 191f receive an infrared light, the robot cleaner 100 may also determine that the docking station 300 is placed in the right side reception region (RSRR).

When the right rear infrared receiver 191f receives an infrared light, the robot cleaner 100 may determine that the docking station 300 is placed in the right rear reception region (RRRR). In addition, when the right rear infrared receiver 191f and the right side infrared receiver 191e receive an infrared light, or when the right rear infrared receiver 191f, the right side infrared receiver 191e, a left rear infrared receiver 191a receive an infrared light, the robot cleaner 100 may also determine that the docking station 300 is placed in the right rear reception region (RRRR).

When both of the left rear infrared receiver 191a and the right rear infrared receiver 191f receive an infrared light, the robot cleaner 100 may determine that the docking station 300 is placed in the right side reception region (RERR).

When the left rear infrared receiver 191a receives an infrared light, the robot cleaner 100 may determine that the docking station 300 is placed in the left rear reception region (LRRR). In addition, when the left rear infrared receiver 191a and the left side infrared receiver 191b receive an infrared light, or when the left rear infrared receiver 191a, the left side infrared receiver 191b and the right rear infrared receiver 191f receive an infrared light the robot cleaner 100 may also determine that the docking station 300 is placed in the left rear reception region (LRRR).

When the left front infrared receiver 191b receives an infrared light, the robot cleaner 100 may determine that the docking station 300 is placed in the left side reception region (LSRR). In addition, when the left side infrared receiver 191b, the left rear infrared receiver 191a and the left front infrared receiver 191c receive an infrared light, the robot cleaner 100 may also determine that the docking station 300 is placed in the left side reception region (LSRR).

When the left front infrared receiver 191c receives an infrared light, the robot cleaner 100 may determine that the docking station 300 is placed in the left front reception region (LFRR). In addition, when the left front infrared receiver 191c and the left side infrared receiver 191b receive an infrared light, or when the left front infrared receiver 191c, the left side infrared receiver 191b and the right side infrared receiver 191d receive an infrared light the robot cleaner 100 may also determine that the docking station 300 is placed in the left front reception region (LFRR).

As mentioned above, the robot cleaner 100 may determine a direction and a position of the docking station 300 by using a direction detected by the plurality of the infrared signal receivers of the signal detector 190 while the robot cleaner 100 moves a plurality of points.

As mentioned with reference to FIG. 8, the robot cleaner 100 may measure a distance to the docking station 300 by using the type and the intensity of the infrared light detected via the signal detector 190 while the robot cleaner 100 moves the plurality of points (1020)

Therefore, since the robot cleaner 100 acquires the direction and the distance, the robot cleaner 100 may determine a position of the docking station 300 via the controller 110.

In addition, the robot cleaner 100 may acquire a position of the docking station 300 by using the geometrical method or probability based method via the controller 110 as well as the above mentioned method (1030).

Hereinafter the geometrical method and probability based method allowing the robot cleaner 100 to acquire a position of the docking station 300 by detecting an infrared signal output from the docking station 300 will be described with reference to FIGS. 15 and 16.

The geometrical method may represent a method to acquire a position of the docking station 300 such that when the robot cleaner 100 detects an infrared output signal of the docking station 300 via the signal detector 190, the robot cleaner 100 derives a straight line equation of directions of an infrared output signal of the docking station 300 while moving a plurality of points, and the robot cleaner 100 determines a point in which the straight lines are crossed as a position of the docking station 300.

Particularly, referring to FIG. 15, in order to acquire an accurate position of the docking station 300, the controller 110 of the robot cleaner 100 may assume that a first time to detect an infrared signal is (t) and a straight line straightly connecting the robot cleaner 100 to directions in which an infrared signal of the docking station 300 is detected is (f1).

In order to acquire an accurate position of the docking station 300, the robot cleaner 100 may assume that a time when the robot cleaner 100 is moved from a position at the above mentioned time (t), which is a position in which an infrared signal is firstly detected, to another position, is (t+1), and a straight line straightly connecting the robot cleaner 100 to a position of (t+1) to a direction in which an infrared signal of the docking station 300 is detected is (f2).

In order to acquire an accurate position of the docking station 300, the robot cleaner 100 may assume that a time when the robot cleaner 100 is moved from a position of (t+1) is moved to another position, is (t+2), and a straight line straightly connecting the robot cleaner 100 to a position of (t+2) to a direction in which an infrared signal of the docking station 300 is detected is (f3).

In order to acquire position information (x, y, θ°) of the docking station 300, the controller 110 of the robot cleaner 100 may calculate a straight line equation (f1, f2, f3) by using a relationship between three variables and three position information since the controller 110 of the robot cleaner 100 acquires position information, which is position information in at (t), position information in at (t+1) and position information in at (t+2), that is measured via the position detector 150.

Therefore, the robot cleaner 100 may determine a cross point (c1) of the calculated straight line equation (f1, f2, f3), which is calculated according to the above mentioned method, as a position of the docking station 300.

However, in this case, it may be possible to acquire a cross point by displaying three straight line equations, but the controller 110 of the robot cleaner 100 may acquire a position of the docking station 300 with two position information by using the triangulation. That is, a distance between two position information, and two direction angles from two position information to a direction of the docking station 300 may be acquired and thus a position of the docking station 300 may be acquired by using the triangulation.

Figure 16:
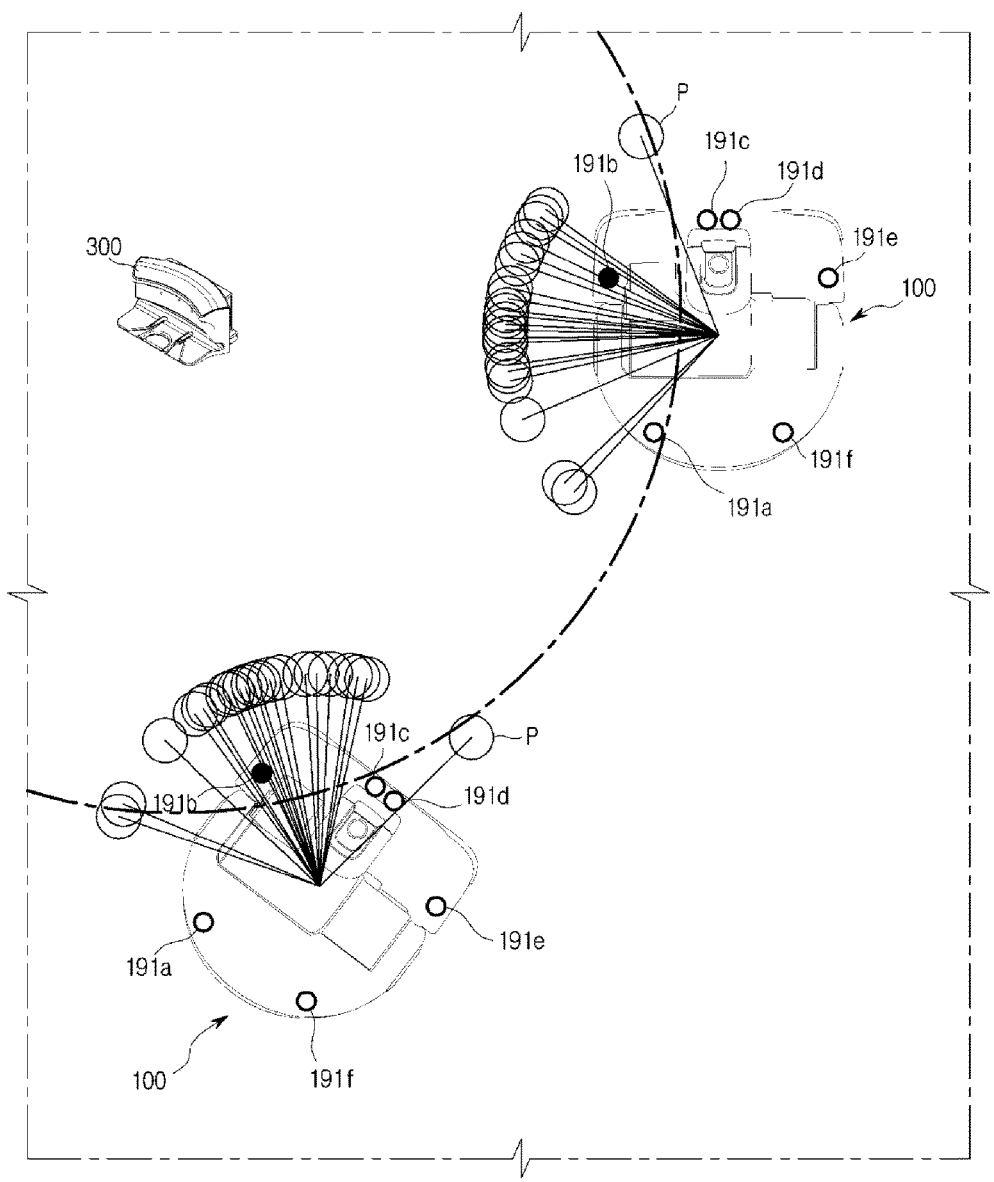
FIG. 16 is a view illustrating an example of a probability based method to acquire a position of a docking station of a robot cleaner.

Referring to FIG. 16, the probability based method may represent a method to acquire a position of the docking station 300 such that when the robot cleaner 100 detects an infrared output signal of the docking station 300 via the signal detector 190, the robot cleaner 100 filters an infrared output signal of the docking station 300 by using a probability based filtering method including Bayes filter, while moving a plurality of points, via the controller 110, so as to estimate a direction of an infrared output signal thereby acquiring a position of the docking station 300.

Hereinafter the probability based filtering method may represent a method for estimating a position of the docking station 300 by the robot cleaner 100 based on Bayes' theorem. Bayes' theorem is a method to calculate the posterior probability by using Likelihood function and prior probability, and according to an embodiment, the robot cleaner 100 may estimate a position of the docking station 300 by filtering an infrared output signal of the docking station 300 according to the probability based filtering method including Bayes filter.

Bayes filter may include Gaussian Filter and Nonparametric Filter. Particularly, Gaussian Filter is a method to represent a probability distribution with Gaussian mean and variance parameters, and Gaussian Filter may be a concept including Kalman Filter, Extended Kalman filter (EKF), Unscented Kalman filter (UKF), and Information filter. Nonparametric Filter is a method to represent a probability distribution with finite sample, and Nonparametric Filter may be a concept including Histogram Filter and Particle Filter.

Particle filter technique is one of the simulation method based on trial and error, and is referred to as Sequential Monte Carlo method (SMC). Monte Carlo Method is one of method for calculating the value of the function stochastically by collecting random input result of a sufficient number. Monte Carlo method may acquire the characteristics of the system by stochastically calculating the value of the function.

The controller 110 of the robot cleaner 100 may employ the probability based filtering method to measure an infrared output signal of the docking station 300 at a plurality of points so as to generate a probabilistic model about a candidate position of the docking station 300 (hereinafter referred to as "particle") thereby acquiring a position of the docking station 300 with the probability distribution.

Particularly, when the controller 110 of the controller 110 detects an infrared output signal of the docking station 300 via the signal detector 190 during the robot cleaner 100 drives, the controller 110 of the robot cleaner 100 may identify an infrared receiver in which the infrared output signal is detected and distribute a particle to the direction of the infrared receiver.

However, when entire of the robot cleaner 100 is placed in the infrared output signal region, the controller 110 of the robot cleaner 100 may distribute a particle toward all directions since all of infrared receivers detect an infrared output signal.

The controller 110 of the robot cleaner 100 may perform a sampling. That is, the controller 110 of the robot cleaner 100 may extract a plurality of samples having an estimated value of a position of the docking station 300 so as to acquire a position of the docking station 300 by using a possibility in which each sample is an actual position of the docking station 300.

Particularly, the controller 110 of the robot cleaner 100 may apply a weight to a particle in a direction in which an infrared output signal of the docking station 300 is detected among the plurality of samples. And then the controller 110 may re-select particles based on the weight to remove a particle having a low possibility to be a position of the docking station 300 besides a particle having a high possibility to be a position of the docking station 300.

This process repeated in a plurality of points will be described with reference to FIG. 16.

FIG. 16 illustrates a distribution of a direction in which an infrared output signal of the docking station 300 is detected during the robot cleaner 100 drives, on a plane surface.

Referring to a lower picture of FIG. 16, the left infrared receiver 191b of the robot cleaner 100 may detect an infrared output signal of the docking station 300.

When the controller 110 of the robot cleaner 100 assumes that a moving direction of the robot cleaner 100 is north, it may be assumed that a direction in which an infrared output signal of the docking station 300 is detected is north-west side. Therefore, the controller 110 may distribute a particle (P) to north-west side.

The controller 110 of the robot cleaner 100 may remove a particle (P) representing a direction having a low possibility of placing the docking station 300, through the sampling. In addition, the controller 110 of the robot cleaner 100 may perform resampling in the way of maintaining a particle (P) representing a direction having a high possibility of placing the docking station 300.

Referring to an upper picture of FIG. 16, the left infrared receiver 191b of the robot cleaner 100 may detect an infrared output signal of the docking station 300.

When the controller 110 of the robot cleaner 100 assumes that a moving direction of the robot cleaner 100 is north, it may be assumed that a direction in which an infrared output signal of the docking station 300 is detected is west side. Therefore, the controller 110 may distribute a particle (P) to west side.

The controller 110 of the robot cleaner 100 may remove a particle (P) representing a direction having a low possibility of placing the docking station 300, through the sampling.

In addition, the controller 110 of the robot cleaner 100 may perform resampling in the way of maintaining a particle (P) representing a direction having a high possibility of placing the docking station 300.

The controller 110 of the robot cleaner 100 may acquire a position of the docking station 300 by calculating a position having the highest degree of distribution of particle (P) by performing the above mentioned process at the plurality of points, as illustrated in FIG. 16.

Hereinbefore the method for acquiring a position of the docking station 300 is described according to the possibility based method. For convenience of description, a particle filer is described as an example, but an example of a method for estimating a position of the docking station 300 by the robot cleaner 100 in accordance with an embodiment of the present disclosure is not limited to a particle filter.

In a state of acquiring a position of the docking station 300 during the robot cleaner 100 drives by using the above mentioned method, when the controller 110 of the robot cleaner 100 determines that the position of the docking station 300 is a reliable position, it may be determined that the robot cleaner 100 revisits to a position of the docking station 300 that is an initial position. That is, the controller 110 of the robot cleaner 100 may determine that a loop closure is detected.

When the controller 110 of the robot cleaner 100 determines that a loop closure is detected, the controller 110 of the robot cleaner 100 may correct the stored first position information by calculating a current position (the second position information) in which the robot cleaner 100 is actually placed, based on the position information of the docking station 300 that is an initial position, and the output signal of the docking station 300 (1040).

A detailed correction method is described in the above with reference to FIGS. 9 to 10B, and thus it will be omitted.

As is apparent from the above description, according to the proposed robot cleaner and control method of the robot cleaner, an error of a position of the robot cleaner during the robot cleaner drives may be minimized.

The coverage ratio of a zone to be cleaned may be improved since a map is updated with respect to a position having a minimized error.

Although a few embodiments of the present invention have been shown and described, it would be appreciated by those skilled in the art that changes may be made in these embodiments without departing from the principles and spirit of the invention, the scope of which is defined in the claims and their equivalents.

| Description of symbols. | |
| --- | --- |
| 100: robot cleaner | 110: controller |
| 120: user interface | 130: image acquisition unit |
| 140: obstacle detector | 150: position detector |
| 160: driving unit | 170: cleaning unit |
| 180: storage | 190: signal detector |
| 200: device | 300: docking station |

What is claimed is:

1. A robot cleaner comprising:
a body;
a driving unit configured to move the body;
a signal detector configured to detect an output signal of a docking station;
a position detector configured to acquire first position information of the body while the body moves;
a storage configured to store the first position information of the body acquired by the position detector; and
a controller, configured to calculate estimated position information for a next point while the body moves and when detecting the output signal of the docking station while the body moves, configured to estimate second position information of the body that is current position information of the robot cleaner using the output signal of the docking station and position information of the docking station, and configured to correct the first position information of the body to minimize an error included in the first position information using the second position information, the first position information and the estimated position information,
wherein the controller generates a map of driving trajectory using the first position information while the body moves and when the first position information is corrected, the controller updates the map of driving trajectory using the corrected first position information.

2. The robot cleaner according to claim 1, wherein the controller acquires a position of the docking station by estimating a point in which directions of the output signal, which is detected in a plurality of different positions while the body moves, are intersected.

3. The robot cleaner according to claim 1, wherein the controller acquires a position of the docking station by estimating a direction of the output signal by filtering the output signal, which is detected in a plurality of different positions while the body moves, according to the probability based filtering method using Bayse filter.

4. The robot cleaner according to claim 3, wherein Bayse filter comprises at least one of Kalman Filter, Extended Kalman filter (EKF), Unscented Kalman filter (UKF), Information filter, Histogram Filter and Particle Filter.

5. The robot cleaner according to claim 1, wherein the controller acquires a position of the docking station by measuring a direction of the output signal detected by the signal detector of the body, and by measuring a distance between the body and the docking station based on a type and an intensity of the output signal.

6. The robot cleaner according to claim 1, wherein the signal detector comprises a signal receiver disposed at a plurality of positions of the body.

7. The robot cleaner according to claim 1, wherein the signal detector detects at least one of a proximity signal, a mid-distance signal, a front signal, and an omnidirectional signal, which are differently output according to each position of a sensor installed in the docking station.

8. The robot cleaner according to claim 7, wherein the signal detector differently detects an intensity of the output signal of the docking station according to a distance between the docking station and the body.

9. The robot cleaner according to claim 1, wherein the output signal of the docking station is an infrared signal.

10. A control method of a robot cleaner provided with a body and a driving unit to move the body, comprising:
   detecting an output signal of a docking station;
   acquiring first position information of the body while the body moves;
   storing the first position information of the body detected by a position detector;
   calculating estimated position information for a next point while the body moves;
   generating a map of driving trajectory using the first position information while the body moves;
   when detecting the output signal of the docking station while the body moves, estimating second position information of the body that is current position information of the robot cleaner using the output signal of the docking station and position information of the docking station; and
   correcting the first position information of the body to minimize an error included in the first position information using the second position information, the first position information and the estimated position information; and
   updating the map of driving trajectory using the corrected first position information.

11. The control method according to claim 10, wherein acquiring a position of the docking station is performed by estimating a point, in which directions of the output signal, which is detected in a plurality of different positions while the body moves, are intersected.

12. The control method according to claim 10, wherein acquiring a position of the docking station is performed by estimating a direction of the output signal by filtering the output signal, which is detected in a plurality of different positions while the body moves, according to the probability based filtering method using Bayse filter.

13. The control method according to claim 12, wherein acquiring a position of the docking station is performed by estimating a direction of the output signal by filtering the output signal according to the probability based filtering method including at least one of Kalman Filter, Extended Kalman filter (EKF), Unscented Kalman filter (UKF), Information filter, Histogram Filter and Particle Filter.

14. The control method according to claim 10, wherein acquiring a position of the docking station is performed by measuring a direction of the output signal detected by the signal detector of the body, and by measuring a distance between the body and the docking station based on a type and an intensity of the output signal.

* * * * *